(12) United States Patent
Lerman

(10) Patent No.: US 11,380,011 B2
(45) Date of Patent: Jul. 5, 2022

(54) MARKER-BASED POSITIONING OF SIMULATED REALITY

(71) Applicant: KreatAR, LLC, New York, NY (US)

(72) Inventor: Liron Lerman, Maplewood, NJ (US)

(73) Assignee: KreatAR, LLC, New York, NY (US)

( * ) Notice: Subject to any disclaimer, the term of this patent is extended or adjusted under 35 U.S.C. 154(b) by 0 days.

(21) Appl. No.: 16/856,916

(22) Filed: Apr. 23, 2020

(65) Prior Publication Data

US 2020/0342625 A1  Oct. 29, 2020

Related U.S. Application Data

(60) Provisional application No. 62/837,559, filed on Apr. 23, 2019.

(51) Int. Cl.
| | | |
|---|---|---|
| G06T 7/73 | (2017.01) | |
| G06T 19/00 | (2011.01) | |
| G06V 10/40 | (2022.01) | |

(52) U.S. Cl.
CPC .............. *G06T 7/74* (2017.01); *G06T 19/006* (2013.01); *G06V 10/40* (2022.01); *G06T 2207/30204* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 10,289,116 B1* | 5/2019 | Dunn | ................... | G06V 10/245 |
| 2007/0081695 A1* | 4/2007 | Foxlin | ...................... | G06T 7/73 |
| | | | | 382/103 |
| 2013/0117377 A1* | 5/2013 | Miller | ................. | H04L 65/4015 |
| | | | | 709/205 |
| 2015/0265922 A1* | 9/2015 | Yamane | ................ | A63F 13/525 |
| | | | | 463/31 |
| 2016/0267661 A1* | 9/2016 | Moteki | ................... | G06T 7/593 |
| 2016/0335525 A1* | 11/2016 | Nakajima | ................ | G06T 7/11 |
| 2017/0075116 A1* | 3/2017 | Gardiner | ................... | G06T 7/73 |
| 2017/0352189 A1* | 12/2017 | Go | ..................... | G06K 9/00671 |
| 2018/0012410 A1* | 1/2018 | Koga | ................. | G06K 9/00671 |
| 2018/0130227 A1* | 5/2018 | Sato | .......................... | G06T 7/70 |
| 2018/0300551 A1* | 10/2018 | Luccin | .............. | H04N 5/23293 |
| 2020/0111232 A1* | 4/2020 | Bleyer | .................... | G06T 7/564 |

FOREIGN PATENT DOCUMENTS

WO   WO-2015025442 A1 *  2/2015   ......... A63F 13/2145

* cited by examiner

*Primary Examiner* — Steven Z Elbinger
(74) *Attorney, Agent, or Firm* — Fox Rothschild LLP

(57) ABSTRACT

Disclosed is a system for presenting simulated reality relative to a user's position. The system includes a camera, memory containing computer-readable instructions, and a processor. The processor processes the instructions to receive a captured image of a marker from the camera. The marker has a position relative to a simulated reality layer. The processor compares the image to one or more stored marker data sets to determine whether the image corresponds to a stored marker data set of the one or more stored marker data sets; detects a corresponding stored marker data set; and determines a position of the camera relative to the marker based on the comparison of the captured image and the one or more stored marker data sets. The processor causes a display, on a display device, of a simulated reality environment having a simulated reality object, based on the determined position of the camera.

22 Claims, 11 Drawing Sheets

MARKER-BASED POSITIONING OF SIMULATED REALITY

CROSS-REFERENCE TO RELATED APPLICATIONS

This application claims priority of U.S. Provisional Application No. 62/837,559, titled "MARKER-BASED POSITIONING OF SIMULATED REALITY," filed on Apr. 23, 2019, which is incorporated herein by reference in full.

FIELD

The present invention relates to systems and methods for marker-based positioning of simulated reality relative to a user.

BACKGROUND

A simulated reality experience provides a three-dimensional (3D) representation of a real or simulated world. Simulated reality encompasses both augmented reality and virtual reality. In an augmented reality experience, a user device receives live image content of a real world environment, and an augmented reality image object is overlaid on the real world environment for display. In a virtual reality experience, a user device receives virtual reality image content of a virtual reality environment, and virtual reality image objects are overlaid on the virtual reality environment for display.

Current methods of mapping a simulated reality environment to a real world environment use computer vision (e.g., cloud anchoring/feature matching). For example, cloud anchoring is based on detected feature points and planes within a three-dimensional physical space. Feature points may indicate a horizontal or vertical surface and/or plane boundaries (e.g., a corner) based on distinct edges, high contrast, and/or a unique texture. Such methods require scanning the entire physical space to recognize feature points within the entire 3D environment. The recognized feature points around the 3D space form a 3D point cloud. Because a 3D environment includes dynamic features and is constantly changing, the 3D point cloud needs to be constantly updated to provide an accurate depiction of the physical space. Such methods, therefore, require large amounts of data and high computational power.

There is a need for a method of positioning a simulated reality environment relative to a physical space with high precision that requires less data and computational power.

The information included in this Background section of the specification, including any references cited herein and any description or discussion thereof, is included for technical reference purposes only and is not to be regarded subject matter by which the scope of the invention as defined in the claims is to be bound.

SUMMARY

Disclosed is a system for determining a position of a user based on image recognition. An embodiment of the system includes a camera, a non-transitory memory containing computer readable instructions, and a processor configured to process the instructions to carry out the process. The process can include receiving a captured image of a marker from the camera. The marker has a position relative to a simulated reality layer. The process includes comparing the captured image to one or more stored marker data sets stored in a database to determine whether the captured image corresponds to a stored marker data set of the one or more stored marker data sets. The process includes detecting a corresponding stored marker data set. The process includes determining a position of the camera relative to the marker based on the comparison of the captured image and the one or more stored marker data sets. The process includes causing a display, on a display device, of a simulated reality environment having simulated reality objects, based on the determined position of the camera.

In some embodiments, each stored marker data set of the one or more stored marker data sets comprises identifying data and location data. The captured image can correspond to a stored maker data set in response to image data extracted from the captured image matching the identifying data of the corresponding stored marker data set within a tolerance threshold. The tolerance threshold can be, for example, at least 60% similarity between the extracted image data and the identifying data.

In some embodiments, in response to executing the programming instruction, the processor is further caused to determine differences between the extracted image data and the identifying data. In response to executing the programming instructions, the processor can be further caused to determine a position of the camera relative to the marker based on the differences between the extracted image data and the identifying data. The extracted image data can be an image point cluster and the identifying data is a marker point cluster.

In some embodiments, in response to executing the programming instructions, the processor is further caused to determine one or more differences between the image point cluster and the marker point cluster; and determine a position and perspective of the camera relative to the marker based on the one or more differences. The one or more differences can be related to one or both of size of points and positioning of the points relative to one another.

In some embodiments, the marker position relative to the simulated reality layer is determined based on the location data of the corresponding stored marker data set. The location data can include coordinates associated with the simulated reality layer. In response to executing the programming instructions, the processor can be further caused to determine a position of the camera relative to the simulated reality layer based on the determined position of the camera relative to the marker.

The simulated reality layer can include a simulated reality object, and in response to executing the programming instructions, the processor can be further caused to determine an orientation, angle, and distance of the simulated reality object relative to the camera based upon the determined position of the camera relative to the simulated reality layer. The simulated reality is augmented reality and/or virtual reality.

In some embodiments, a plurality of marker data sets are stored, and at least one stored marker data set corresponds to a unique marker. The markers used can be for example, two-dimensional images, and fixed, and/or repositionable. The marker can be placed in a discrete location within a physical environment. The position of the user relative to the simulated reality layer can be used to determine the manner in which simulated reality objects are displayed to the user.

This Summary is provided to introduce a selection of concepts in a simplified form that are further described below in the Specification. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

Figure 1:
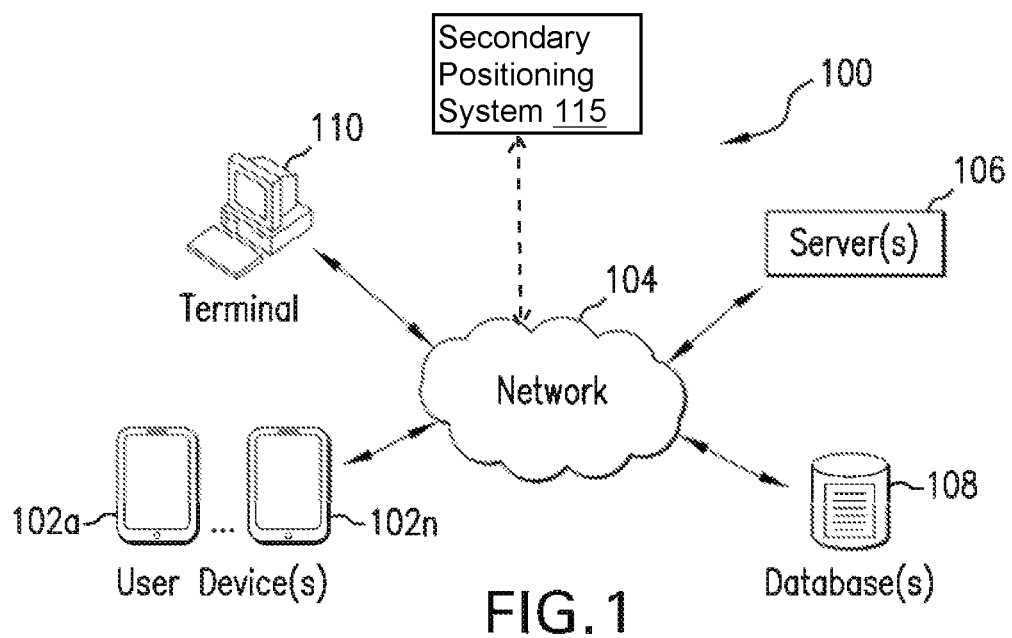
FIG. 1 is a diagram of a system for marker-based simulated reality positioning according to an embodiment.

In several embodiments herein, systems and methods for determining a position of a user based on image recognition are disclosed. In many embodiments, an image of a marker (e.g., an identifiable physical structure) may be captured, processed, and compared to marker data stored by the system. Based on this comparison, the system may determine the user's position relative to the marker (e.g., the user's perspective of the marker).

In several embodiments, the disclosed system may use image recognition to determine a position of a simulated reality environment relative to a user. A marker of the present system may have a position relative to a simulated reality environment. The disclosed system may determine the user's position relative to the marker based on image recognition. The system can then calculate the user's position relative to the simulated reality environment based on the known position of the marker relative to the simulated reality environment.

By using one or more markers (e.g., discrete physical structures) to determine a user's position relative to a simulated reality environment, systems and methods of the present disclosure eliminate the need to scan the entire three-dimensional environment and process information extracted from the entire three-dimensional space. Further, because a marker of the present disclosure is independent of the dynamic surrounding environment, the marker may provide a consistent, reliable anchor to the simulated reality environment that is not possible with current three-dimensional computer vision, which requires constant updates to account for the changing physical environment. In this manner, systems and methods of the present disclosure increase accuracy and reliability and reduce the computational power necessary to provide a user with a simulated reality experience.

A simulated reality environment is also referred to herein as a simulated reality layout, simulated reality layer, or simulated reality experience. Simulated reality systems can be displayed on two-dimensional (2D) devices such as computer screens, mobile devices, or other suitable 2D displays. Simulated reality systems can also be displayed in 3D such as on a 3D display or hologram. Examples of simulated reality include virtual reality (VR), augmented reality (AR), and traditional 3D representations on a 2D display. Simulated reality systems immerse users in environments that are either partially or entirely simulated. In AR environments, users interact with real world information via input sensors on the device, providing a partially simulated environment. In VR environments, the user is fully immersed in a 3D simulated world. Each type of simulated reality system may have objects or assets that are simulations of (i.e., corresponds to) real world items, objects, places, people, or similar entities. The objects or conditions can also provide feedback through haptics, sound or other suitable methods.

In some embodiments herein, a user may initiate a simulated reality experience by scanning a marker with a camera (e.g., an onboard camera of a mobile phone). The user's position relative to the simulated reality environment is determined based on the user's position relative to the marker. The simulated reality environment, including any simulated reality objects or assets, may be displayed to the user (e.g., on a display of the mobile phone) from a perspective that correlates to the user's perspective relative to the marker. As the user moves through physical space, the user's position (and perspective) changes relative to the simulated reality environment based on the mapping of the simulated reality environment relative to the physical space. As the user moves away from the marker, internal navigation within the user device may determine the user's position relative to the physical world and corresponding simulated reality environment. The marker may be scanned again, or, in some embodiments, another marker may be scanned, to recalibrate the user's position relative to the simulated reality environment.

Turning to the figures, systems and methods for presenting simulated reality using one or more markers will now be discussed. FIG. 1 is a diagram of a marker-based simulated reality positioning system 100 for positioning simulated reality relative to one or more user devices 102a-n, and for presenting simulated reality content based on the relative positioning of the simulated reality environment. The user device(s) 102a-n can be any of various types of computing devices, e.g., smart phones, tablet computers, desktop computers, laptop computers, set top boxes, gaming devices, wearable devices, or the like. The user device(s) 102a-n provides output to and receives input from a user. For example, the user device(s) 102a-n may receive marker information from a user and output positioning information and simulated reality to a user. The simulated reality presentation can be displayed according to various suitable methods, for example, on a display screen of a user device 102, or through a separate headset, focal lens, or other suitable device that is communicatively coupled to the user device 102. The type and number of user devices 102a-n may vary as desired.

The user device(s) 102a-n includes a camera that captures image content. The captured image content can be two-dimensional or three-dimensional. It is contemplated that more than one camera may be used with the present system 100. For example, one camera may be used to detect and scan one or more markers and another camera may be used to navigate through a simulated reality environment that is mapped to the physical environment. The user device(s) 102a-n can communicate with one or more servers 106 via a network 104. The user device(s) 102a-n can communicate with the network 104, for example, by way of a wireless access point, a cellular cite, and/or by other suitable access points, such as Bluetooth or other connections.

The user device(s) 102a-n can have communication interfaces and/or sensors for detecting data that is indicative of a condition attribute of the user device(s) 102a-n. For example, the user device(s) 102a-n can have a global positioning system (GPS) interface that communicates with a GPS satellite to receive information indicative of a geo-location of the user device(s) 102a-n. The user device(s) 102a-n can have a compass, magnetometer, or other sensor for detecting or determining the heading of the user device(s) 102a-n. The user device(s) 102a-n can have an accelerometer, e.g., comprising piezoelectric sensors, for detecting movement of the user device(s) 102a-n. The accelerometer can also indicate tilt of the user device(s) 102a-n, including its pitch, roll, and yaw and position and/or movement about its pitch, roll, and yaw axes. The user device(s) 102a-n can have a barometric pressure sensor or other sensors for detecting an altitude of the user device(s) 102a-n. The user device(s) 102a-n can have a wireless network communication interface and can be configured to detect the proximity of the user device(s) 102a-n to a wireless access point.

The network 104 may be substantially any type or combination of types of communication system for transmitting data either through a wired or wireless mechanism (e.g., Wi-Fi, Ethernet, Bluetooth, cellular data, or the like). In some embodiments, certain components in the system 100 may communicate via a first mode (e.g., Bluetooth) and others may communicate via a second mode (e.g., Wi-Fi). Additionally, certain components may have multiple transmission mechanisms and be configured to communicate data in two or more manners. The configuration of the network 104 and communication mechanisms for each of the components may be varied as desired.

The server(s) 106 includes one or more computing devices that process and execute information. The server(s) 106 may include its own processing elements, memory components, and the like, and/or may be in communication with one or more external components (e.g., separate memory storage) (an example of computing elements that may be included in the server(s) 106 is disclosed below with respect to FIG. 2). The server(s) 106 may also include one or more server computers that are interconnected together via the network 104 or separate communication protocol. The server(s) 106 may host and execute a number of the processes executed by the system 100.

The system 100 stores marker data or virtual markers, for example, in one or more databases 108. The stored marker data can be uploaded to the database(s) 108 from one or more user devices 102a-n. The stored marker data can include marker identification information and marker location information, as discussed in more detail below. While FIG. 1 shows the database(s) 108 being a remote database (e.g., cloud-based database) communicatively coupled to the user device(s) 102a-n and server(s) 106 via network 104, in some embodiments, the database(s) 108 can be stored in a local memory of the user device(s) 102a-n and/or in a local memory of the server(s) 106. The system 100 may include a secondary positioning system 115, as will be described later.

A managing terminal 110 can be communicatively coupled to the server(s) 106 and/or the database(s) 108 via network 104, for managing the system 100. For example, a manager of the system 100 can use terminal 110 to assign, modify, update, and/or confirm marker data associated with a simulated reality environment and simulated assets stored in the database(s) 108.

Figure 2:
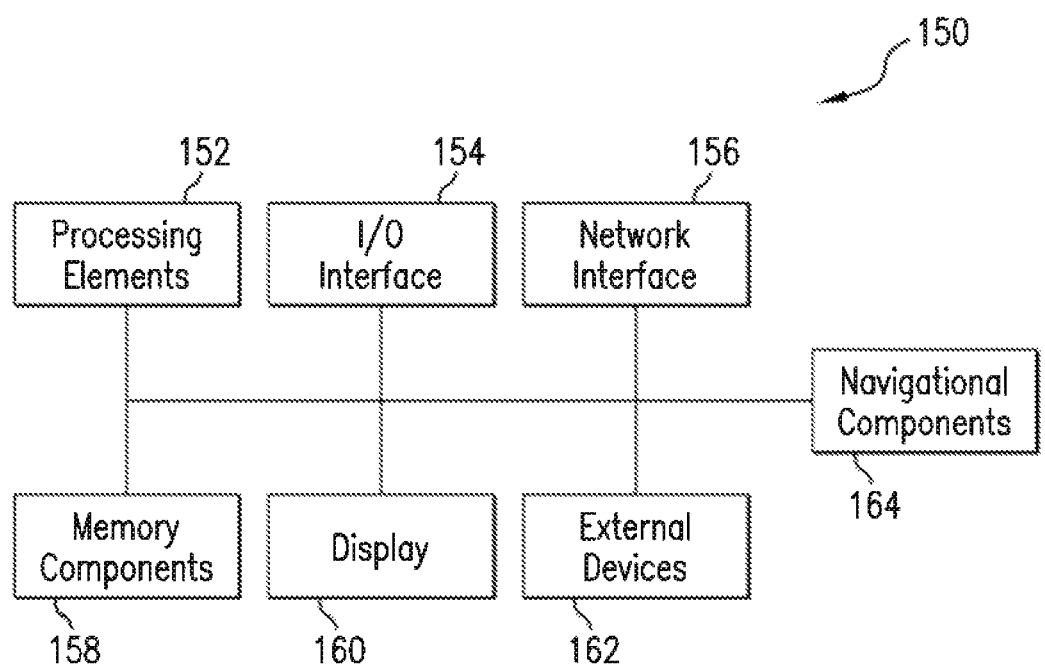
FIG. 2 is a simplified block diagram of a computing device that may be used with the system of FIG. 1.

A simplified block structure for a computing device 150 that may be used with the system 100 or integrated into one or more of the system 100 components is shown in FIG. 2. For example, the server 106, user device(s) 102a-n, managing terminal 110 and/or database(s) 108 may include one or more of the components shown in FIG. 2 and use one or more of these components to execute one or more of the operations disclosed in methods 200 and 250. With reference to FIG. 2, the computing device 150 may include one or more processing elements 152, an input/output (I/O) interface 154, a network interface 156, one or more memory components 158, a display 160, and one or more external devices 162. Each of the various components may be in communication with one another through one or more busses, wireless means, or the like.

The one or more processing elements 152 may be substantially any electronic device capable of processing, receiving, and/or transmitting instructions. For example, the processing element(s) 152 may be a central processing unit, microprocessor, processor, or a microcomputer. Additionally, it should be noted that the processing element(s) 152 may include more than one processing member. For example, a first processing element 152 may control a first set of components of the computing device 150 and a second processing element 152 may control a second set of components of the computing device 150, where the first and second processing elements 152 may or may not be in communication with each other, e.g., a graphics processor and a central processing unit which may be used to execute instructions in parallel and/or sequentially.

The input/output interface 154 allows the computing device 150 to receive inputs from a user and provide output to the user. For example, the input/output interface 154 may include a capacitive touch screen, keyboard, mouse, camera, stylus, or the like. The type of devices that interact via the input/output interface 154 may be varied as desired. Additionally, the input/output interface 154 may be varied based on the type of computing device 150 used. Other computing devices 150 may include similar sensors and other input/output devices 154.

The memory components 158 are used by the computing device 150 to store instructions for the processing elements 152, as well as store data, such as marker data, location data, simulated reality layout mapping information, and the like. The memory components 158 may be, for example, non-volatile storage, a magnetic storage medium, optical storage medium, magneto-optical storage medium, read only memory, random access memory, erasable programmable memory, flash memory, or a combination of one or more types of memory components 158.

The display 160 may be separate from or integrated with the computing device 150. For example, for cases in which the computing device 150 is a smart phone or tablet computer, the display 160 may be integrated with the computing device 150 and in instances where the computing device 150 is a server or a desktop computer where the display 160 may be separate from the computing device 150. The display 160 provides a visual output for the computing device 150 and may output one or more graphical user interfaces (GUIs). The display may be a liquid display screen, plasma screen, light emitting diode screen, cathode ray tube display, and so on. The display 160 may also function as an input device in addition to displaying output from the computing device 150 to enable a user to control, manipulate, and calibrate various components of the computing device 150. For example, the display 160 may include capacitive touch sensors, infrared touch sensors, resistive grid, or the like that may capture a user's input to the display 160.

The network interface 156 receives and transmits data to and from the computing device 150. The network interface 156 may transmit and send data to the network 104, other computing devices, or the like. For example, the network interface 156 may transmit data to and from other computing devices through the network 104 which may be a wireless network (Wi-Fi, Bluetooth, cellular network, etc.) or a wired network (Ethernet), or a combination thereof. In particular, the network 104 may be substantially any type of communication pathway between two or more computing devices. For example, the network interface 156 may include components that are wireless, wired (e.g., USB cable), or a combination thereof. Some examples of the network 104 include cellular data, Wi-Fi, Ethernet, Internet, Bluetooth, closed-loop network, and so on. The type of network 104 may include combinations of networking types and may be varied as desired.

The external devices 162 are one or more devices that can be used to provide various inputs to the computing device 150, e.g., a mouse, microphone, keyboard, trackpad, or the like. The external devices 162 may be local or remote and may vary as desired. The navigational components 164 of the computing device may include a global positioning system (GPS) interface, accelerometer, gyroscope, and magnetometer. For example, the navigational components 164 may include inertial measurement units.

In several embodiments herein, a simulated reality environment may be mapped to a physical space such that a marker and a user positioned in physical space have a position relative to the simulated reality environment. The physical environment may be an indoor environment (e.g., an office, store, hallway, mall, hospital, classroom, etc.) or an outdoor environment (e.g., street, patio, market, fair grounds, etc.). In one example, the physical environment may have a physical floorplan and the simulated reality environment may have a corresponding simulated floorplan that maps to the physical floorplan. For example, the position of physical features (e.g., physical walls, floors, isles, trees, buildings, etc.) within a physical floorplan may have corresponding simulated features (e.g. simulated walls, floors, isles, buildings, etc.) within the simulated floorplan.

In various embodiments, the physical environment may have certain dimensions that can be mapped to a coordinate system (e.g., XYZ coordinates). The simulated reality environment may have a corresponding coordinate system that maps the simulated reality environment to the physical environment. In an additional example, a physical marker may be placed at a particular location within the physical environment. A corresponding virtual marker or virtual representation of the physical marker may be placed at a specific location within the simulated reality environment. The virtual marker may be aligned with the physical marker to position the simulated reality environment relative to the physical environment.

In some examples, the simulated reality layout may have the same dimensions as the physical space. For example, the simulated reality layout can be scaled, rotated, and the like in order to fit the physical space. In other examples, the simulated reality layout may be smaller or larger than the physical space. In some examples, multiple simulated reality layouts may be mapped to a single physical space.

Figure 4:
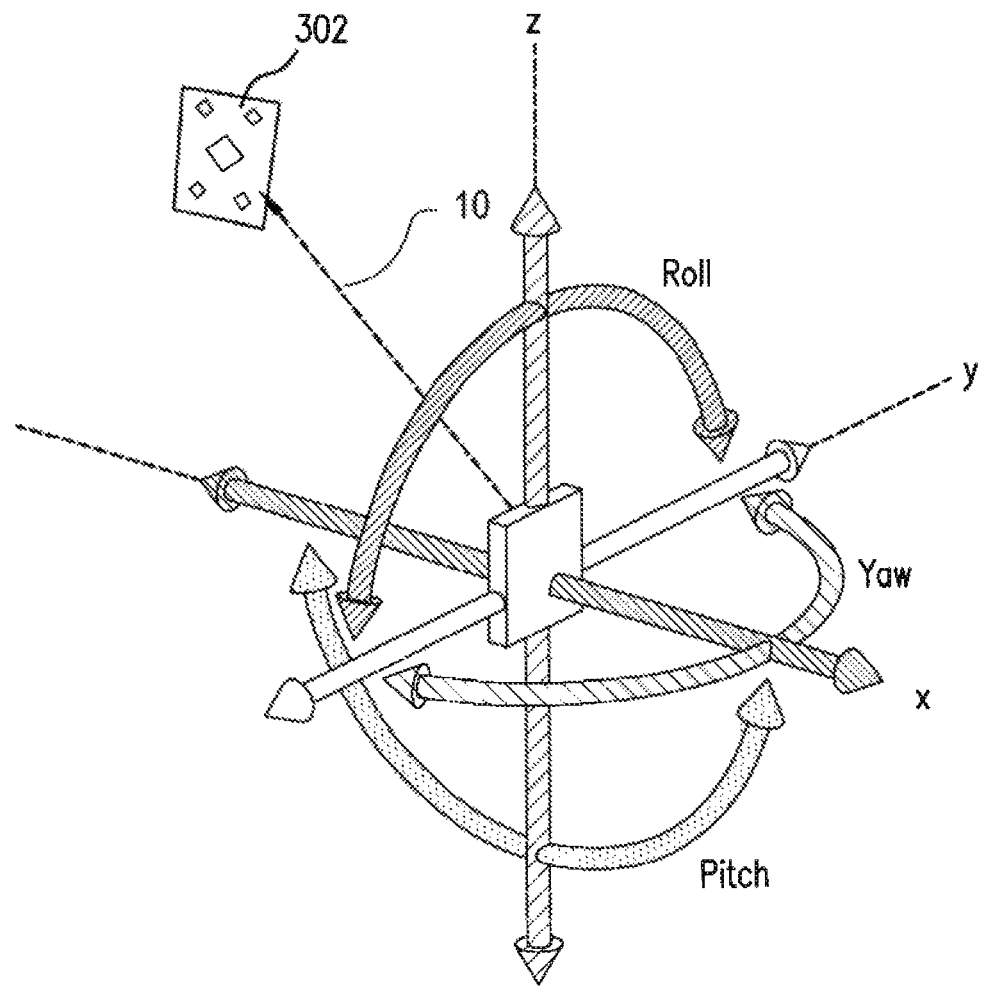
FIG. 4 is a schematic of an orientation system for a handheld device relative to a marker.

In accordance with various embodiments, the position of the user device 102 can be located relative to a marker 302. As shown, in FIG. 4 the user device can be located with respect to one or more of 6 dimensions including X, Y, and Z coordinate axes and roll pitch and yaw. Thus the specific position relative to the marker 302 can be gleaned via a visual inspection of the marker 302 by the device 102 discussed in more detail below. The viewing direction denoted by the reference numeral 10.

Figure 5:
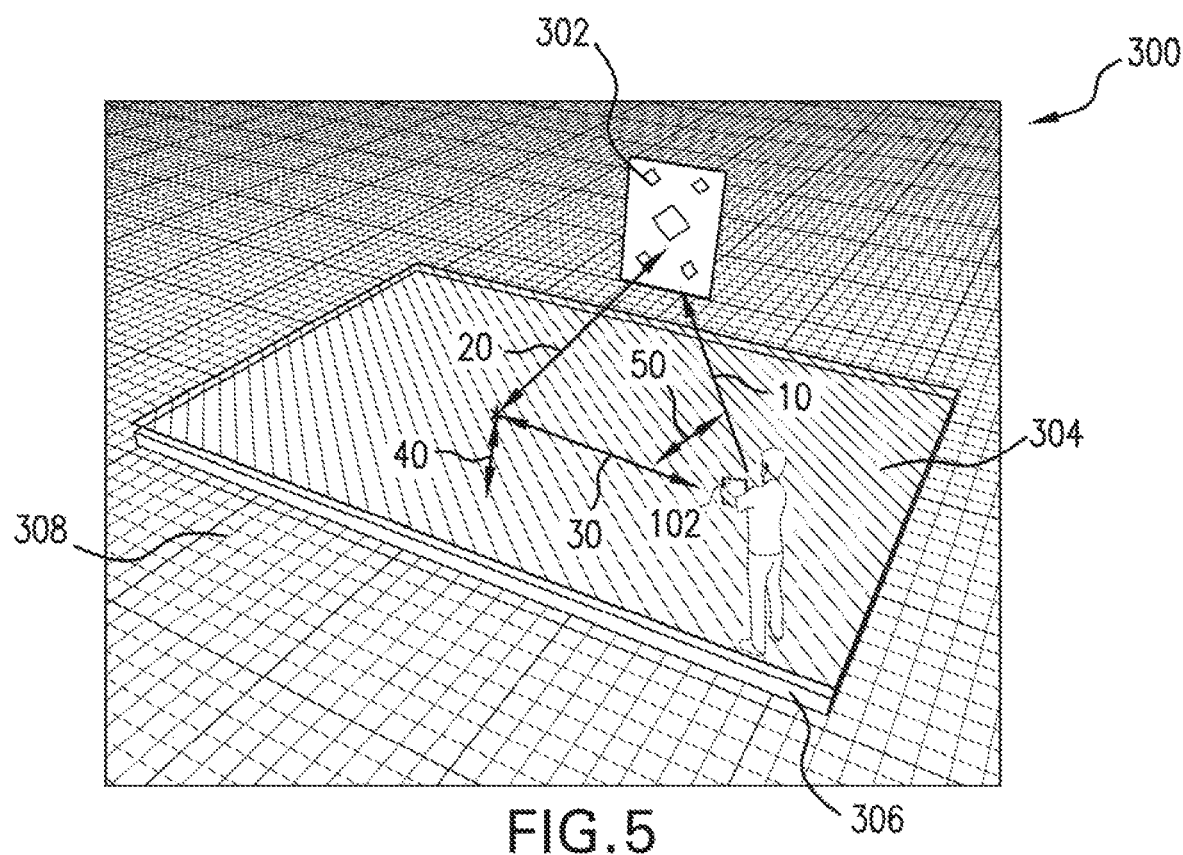
FIG. 5 is schematic representation of an exemplary simulated reality layout mapped to a physical space with a single marker.
Figure 6:
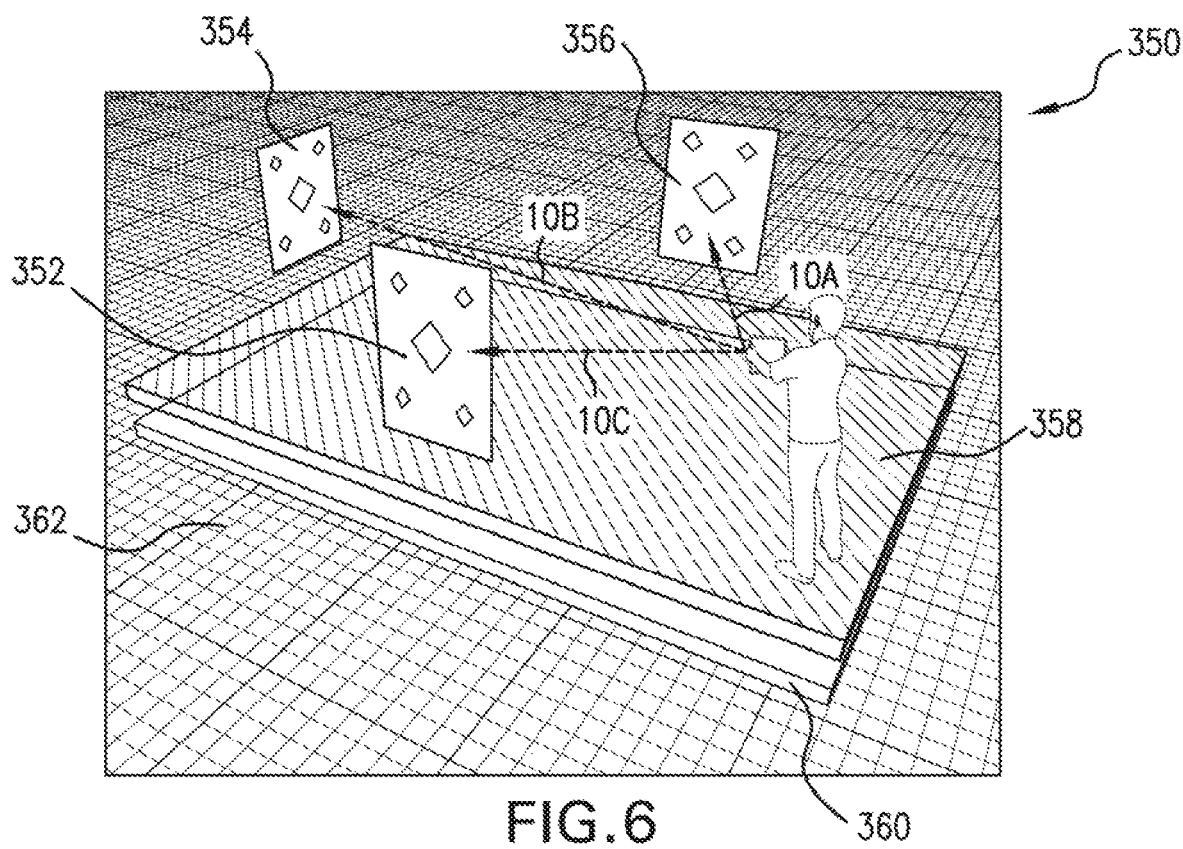
FIG. 6 is a schematic representation of an exemplary simulated reality layout mapped to a physical space with a plurality of markers.
Figure 7:
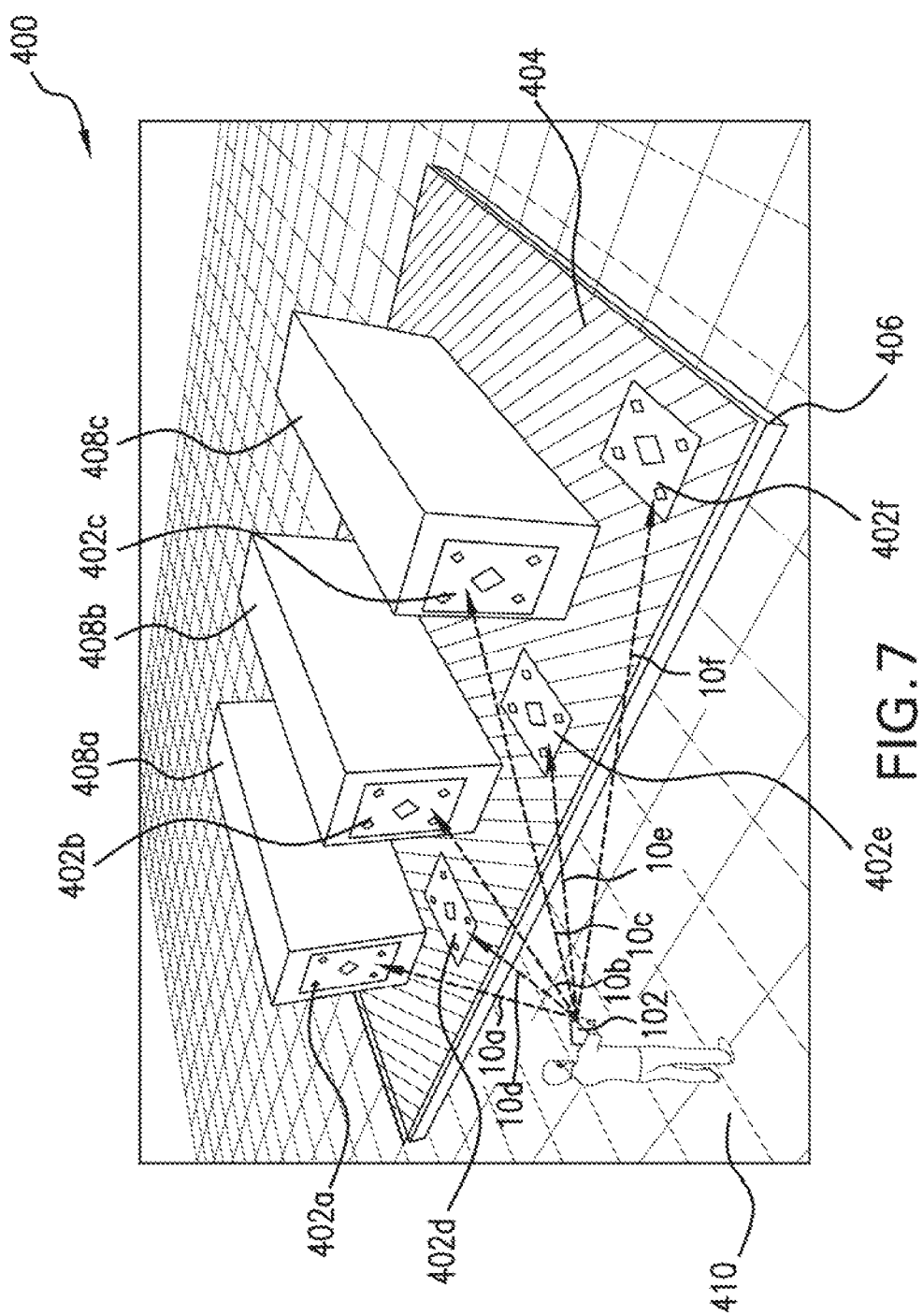
FIG. 7 is a schematic representation of an exemplary simulated reality floor plan mapped to a physical floor plan.
Figure 8B:
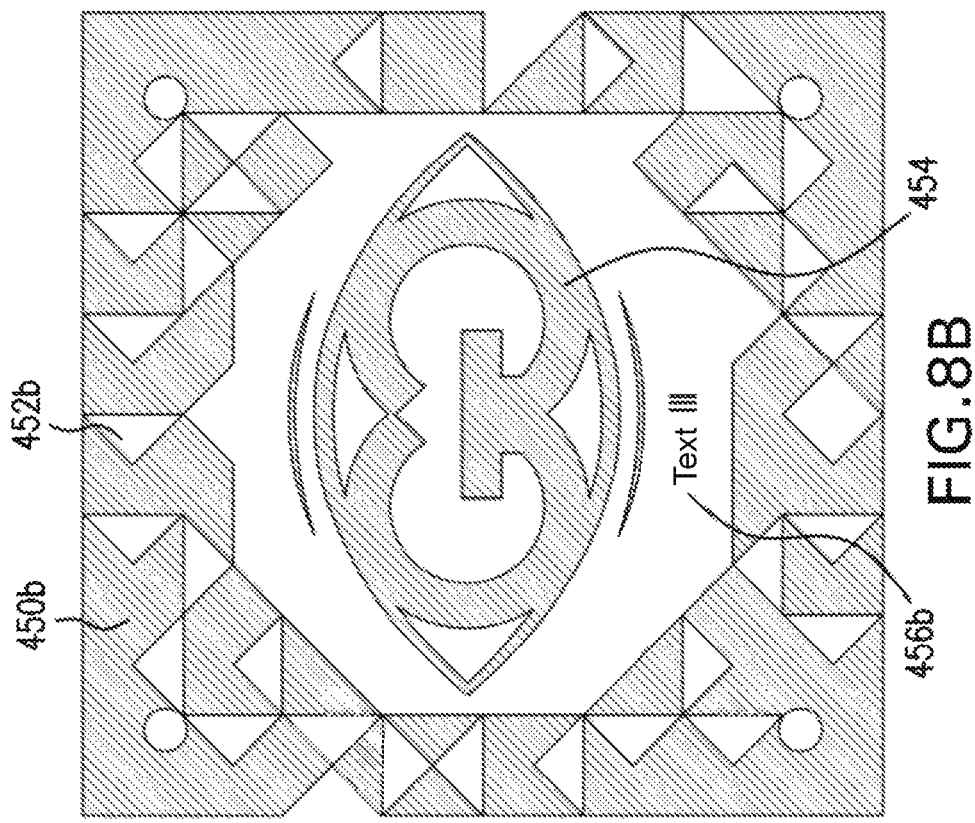
FIGS. 8A-8D are exemplary physical markers that may be used with the system of FIG. 1.
Figure 8A:
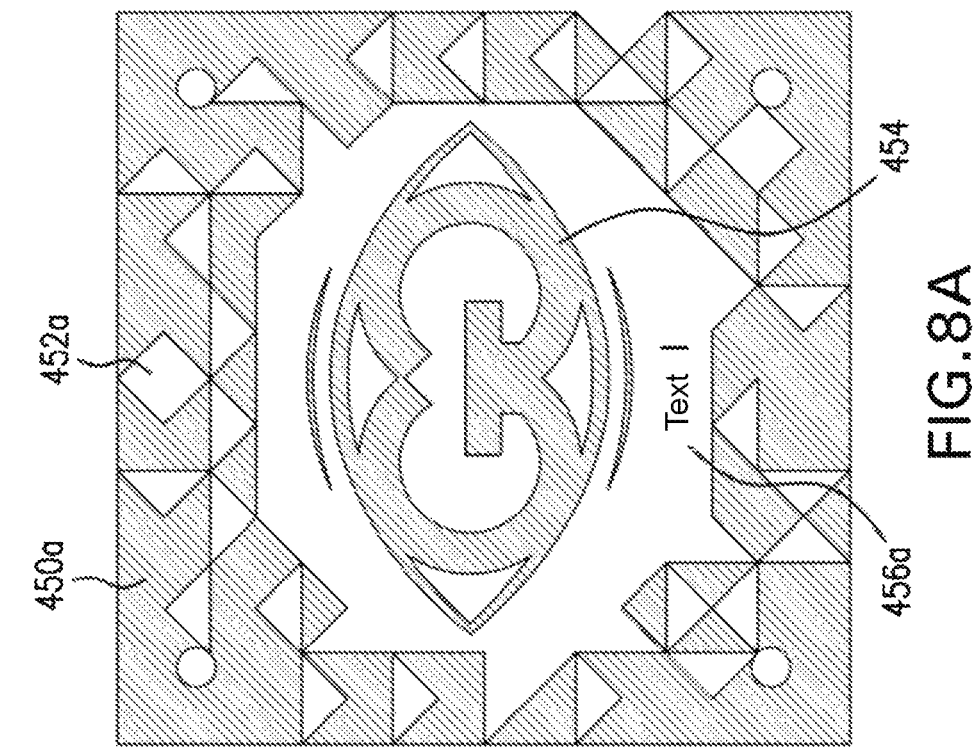
Figure 8D:
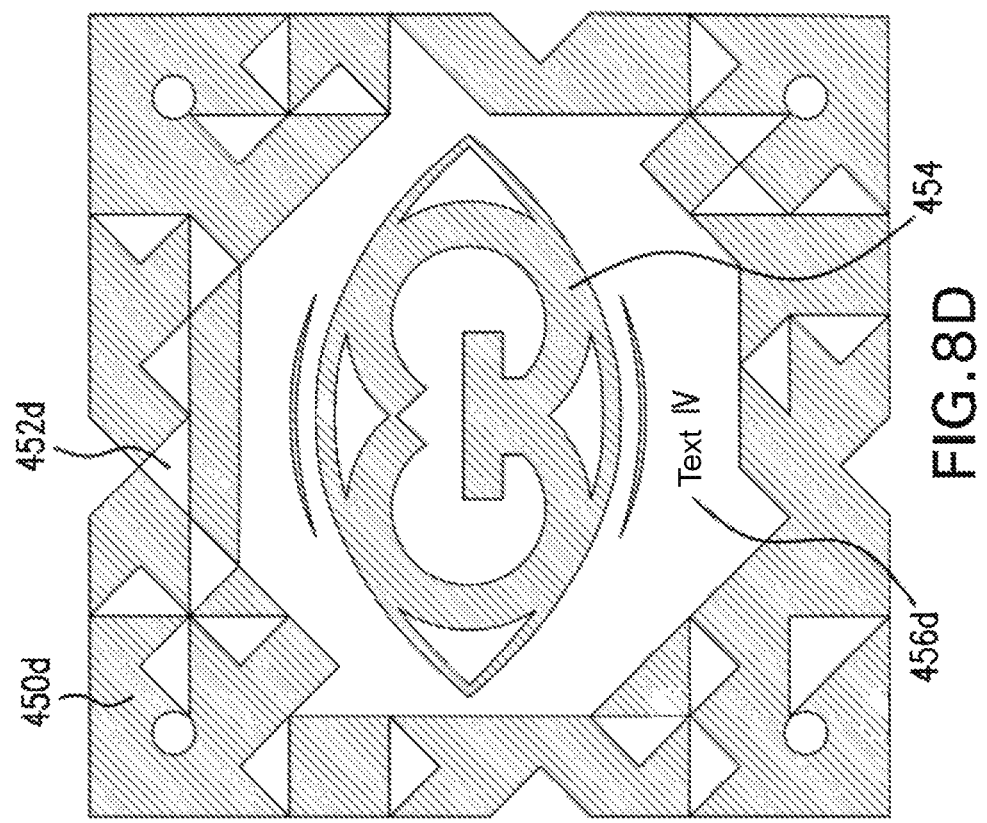
Figure 8C:
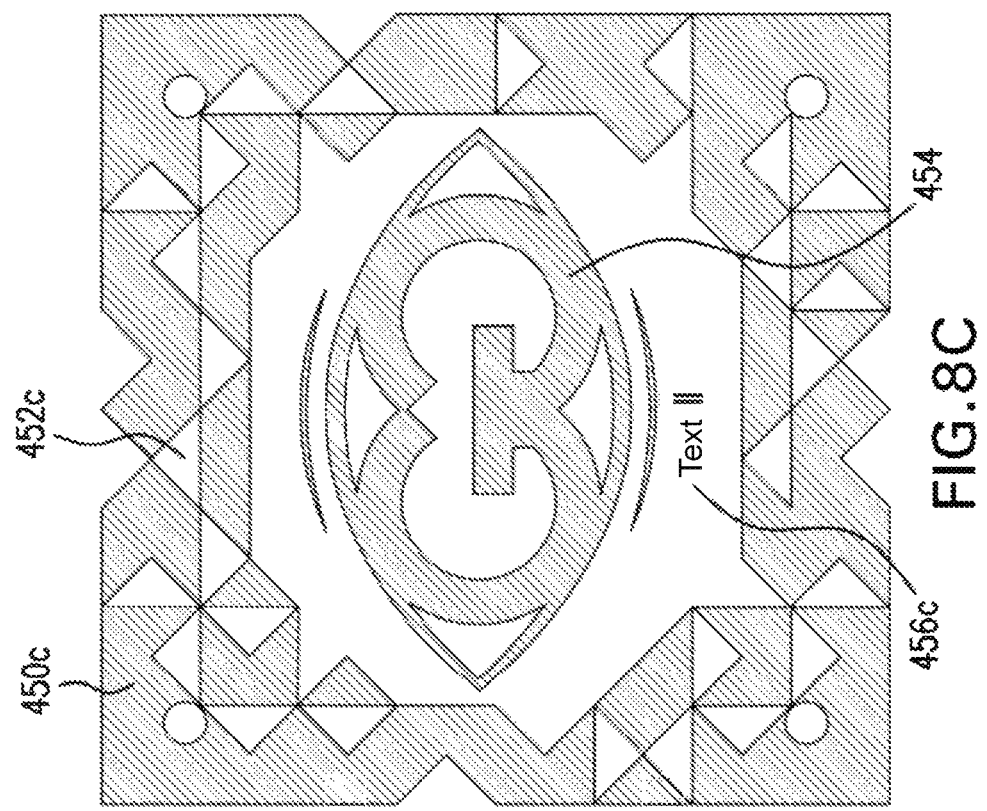

As an example, FIGS. 5-7 show schematic representations of simulated reality systems 300, 350, 400 that can be created and presented according to disclosed systems and methods. FIG. 5 shows a simulated reality system 300 with a single physical marker 302. In this example, a simulated reality layer 304 is mapped to the physical space 306 by a coordinate system or grid 308. The physical marker 302 has a known position relative to both physical space 306 and the simulated reality layer 304 based on the coordinate system or grid 308. Additionally, the position of the device 102 can be determined via inspection of the marker 302 along viewing direction 10. Based on the angle, size, and overall appearance of the known marker 302, the location of the device 102 is determinable. For example, the height 40, lateral distance 20, and transverse distance 30 can be determined relative to the marker. Additionally, the angle of the viewing direction 50 relative to the transverse direction can also be determined. In various embodiments the roll, pitch, and yaw, of the device 102 can be determined by inspection of the marker 302 in addition to or instead of use of the internal sensors of the device 102. This information allows the system to locate the device 102 within the physical and/or simulated space.

FIG. 6 shows a simulated reality system 350 with a plurality of physical markers 352, 354, 356. A simulated reality layer 358 is mapped to the physical space 360 by a coordinate system or grid 362. In this example, each marker 352, 354, 356 may have a known position relative to both the physical space 360 and the simulated reality layer 358 based on the coordinate system or grid 362. However, it is also contemplated that one marker 352 has a known position relative to the simulated reality layer 358, while the other markers 354, 356 have known positions relative to the physical space 360 relative to the first marker 352, as discussed in more detail below. In this example, the position of the markers 354, 356 relative to the simulated reality layer 358 can be determined through triangulation with the first maker 352. Additionally, the position of the device 102 can be determined based on inspection of the markers 352, 354, and 356 along viewing directions 10C, 10B, and 10A respectively.

FIG. 7 shows a simulated reality system 400 with a simulated reality floor plan 404 mapped to a physical space 406. In this example, the simulated reality floor plan 404 includes simulated reality assets overlaid on the physical space 406. The simulated reality assets in this example are aisles 408*a-c*. A plurality of markers 402*a-f* are included with the system 400. In this example, virtual markers 402*a-f* are shown, each representing a simulation of a physical marker located in the physical space 406. The simulated reality floor plan 404 may be mapped to the physical space 406 by a coordinate system or grid 410 and/or based on corresponding features in both environments. For example, the virtual aisles 408*a-c* may map to physical aisles located in the physical space 406. Alternatively or additionally, the virtual markers 402*a-f* may map to physical markers located in the physical space 406. Additionally, the position of the device 102 can be determined based on inspection of the markers 402*a*, 402*b*, 402*c*, 402*d*, 402*e*, and 402*f* along viewing directions 10*a*, 10*b*, 10*c*, 10*d*, 10*e*, and 10*f* respectively.

Figure 3A:
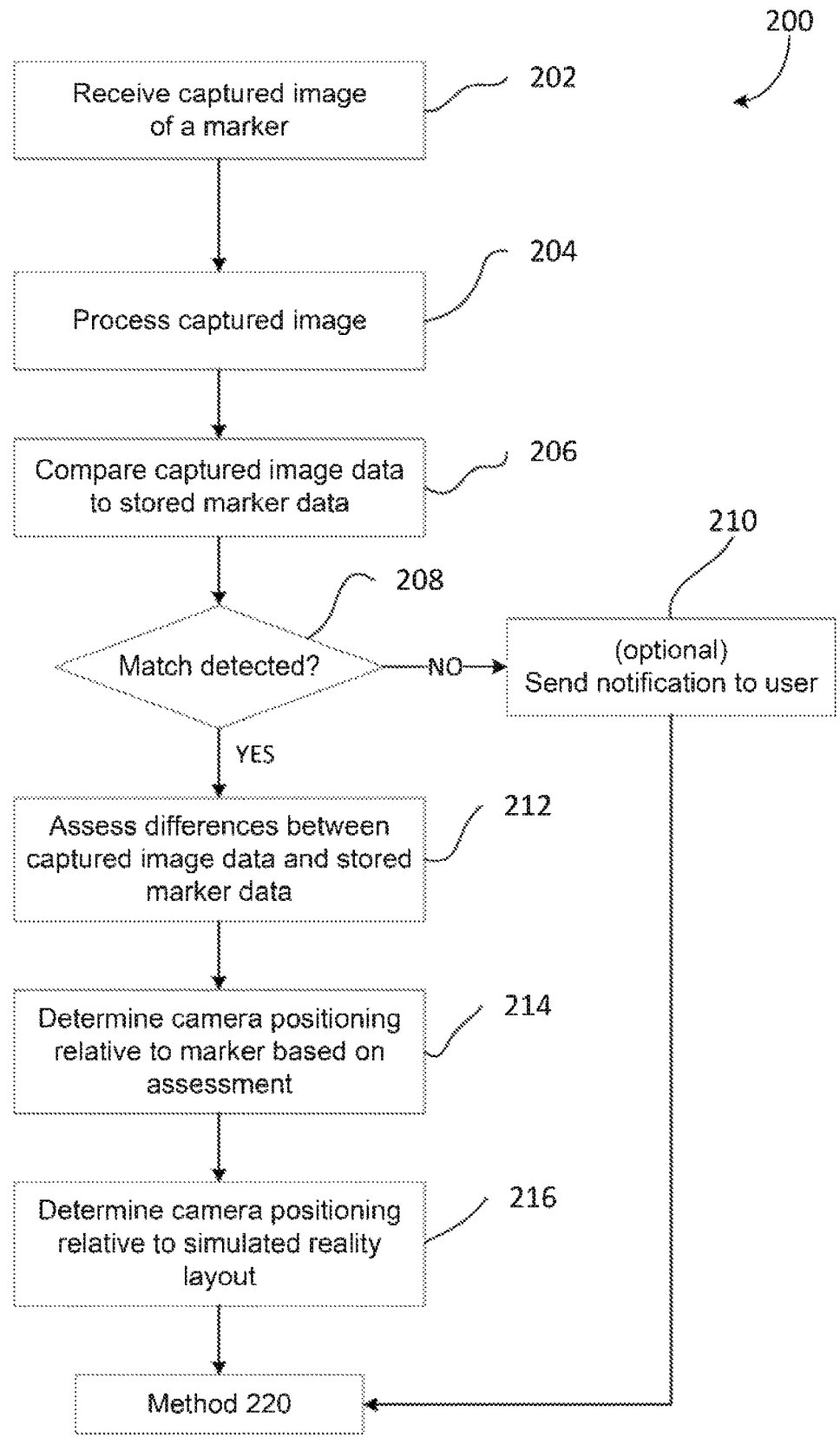
FIG. 3A is a flow chart illustrating a method for positioning a user relative to a simulated reality environment based on a marker, which may be performed by the system of FIG. 1.
Figure 3B:
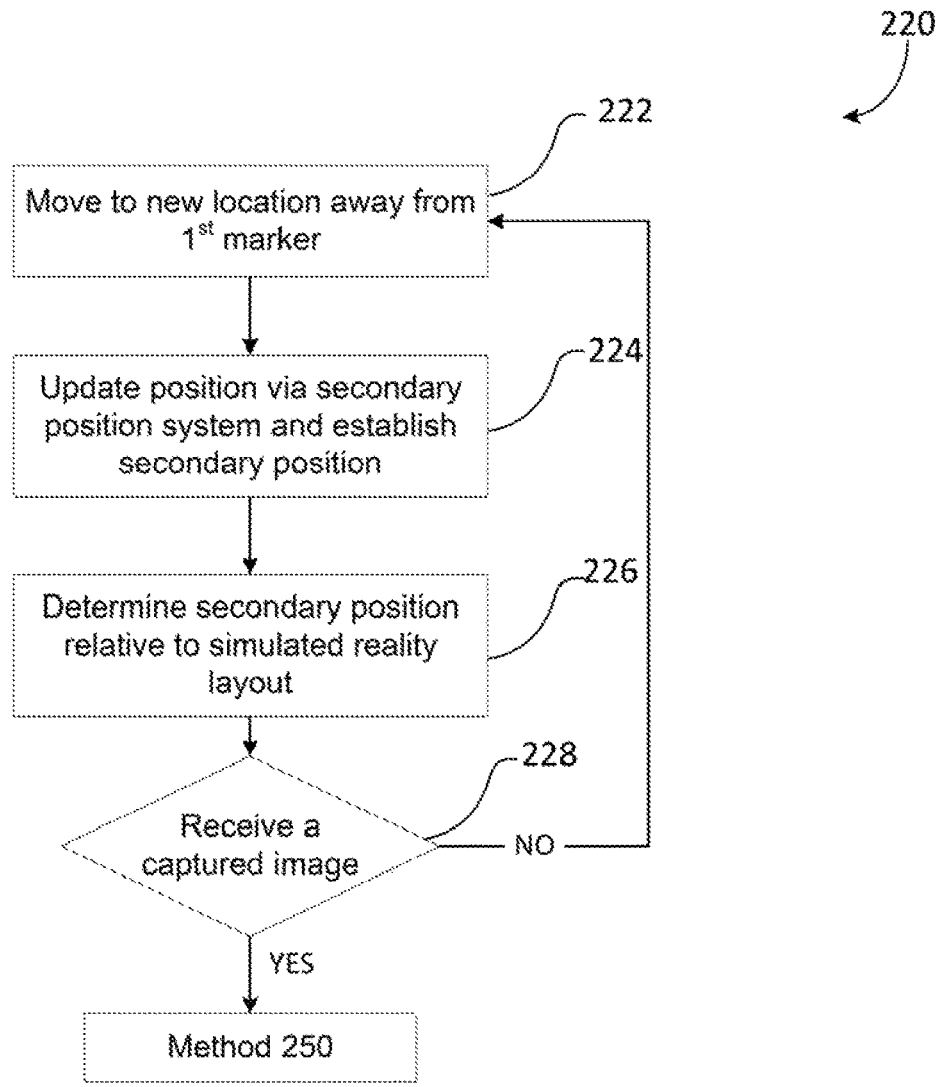
FIG. 3B is a flow chart illustrating a method for positioning a user relative to a simulated reality environment based on a secondary positioning system, which may be performed by the system of FIG. 1.
Figure 3C:
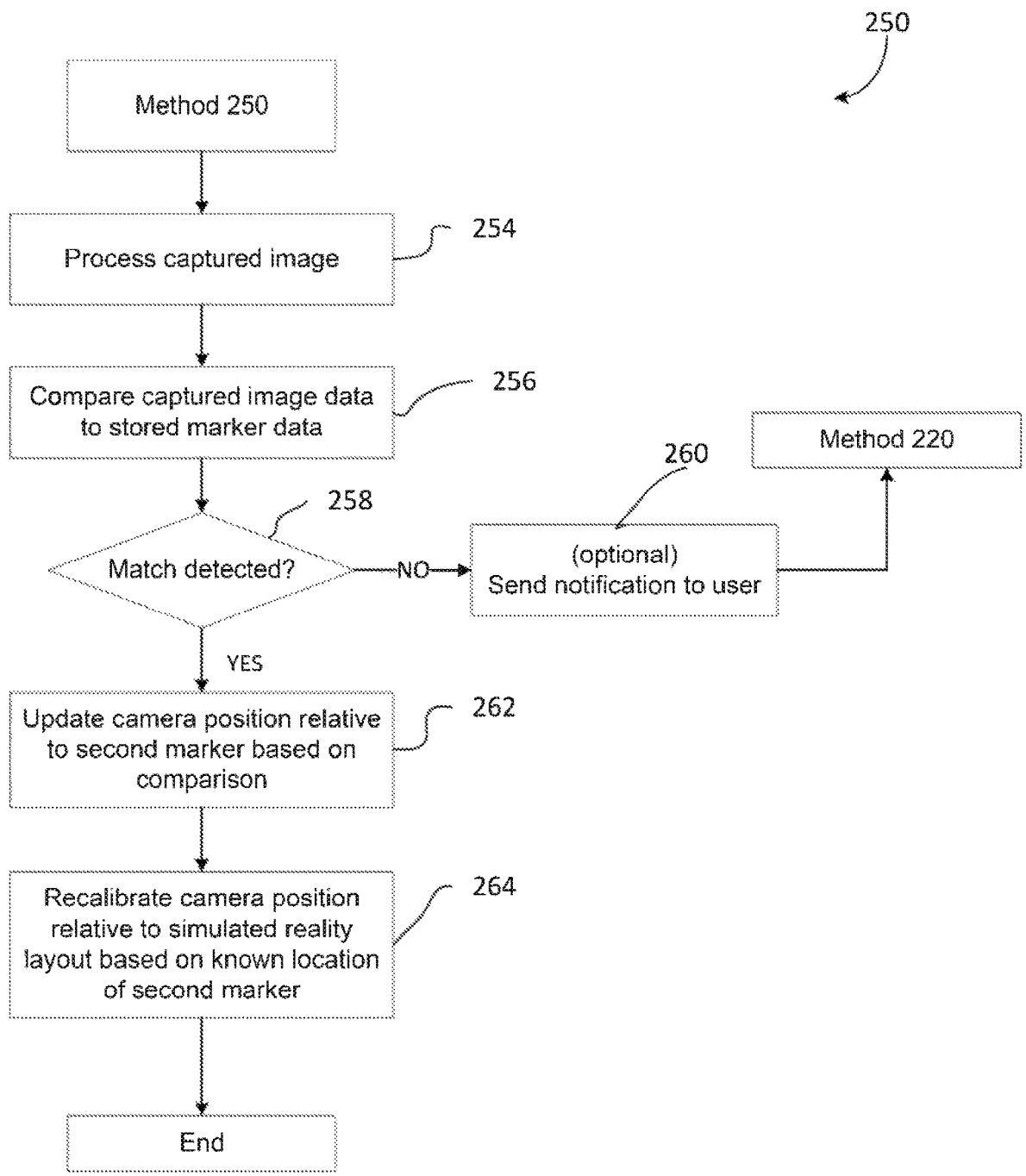
FIG. 3C is a flow chart illustrating a method for recalibrating a user's position relative to a simulated reality environment based on a plurality of markers, which may be performed by the system of FIG. 1.

FIGS. 3A-3C are flowcharts illustrating a method for positioning a user relative to a simulated reality environment. In part these methods utilize a marker for positioning the user. The systems, however, can also utilize a secondary positioning system when the user is between markers. The positioning process 200 may be carried out by one or more processing elements 152 within computing device 150. In accordance with various embodiments, as shown in operation 202, the positioning process 200 includes receiving a captured an image of a marker. A marker may be an identifiable physical structure that is positionable within a physical environment (e.g., an office, store, hallway, classroom, street, park, etc.). The marker may be positioned in a discrete location within the physical environment and cover only a portion of the physical space within the environment. A marker may be detectable by a camera. As one example, a marker may be a two-dimensional image. For example, a marker may be a picture, design, shape, pattern, logo, barcode, text, or the like. In some examples, the two-dimensional image may be a plurality of detectable points. As one example, the detectable points may be intersection points where lines intersect. The two-dimensional image may be fixed to a surface. If the surface is flat (e.g., a wall), then the two-dimensional image may also lay flat against the surface. If the surface is curved (e.g., a bottle), then the two-dimensional image may also be curved.

As another example, a marker may be a three-dimensional object. For example, a marker may be a readily detectable object. A readily detectable object may be a 3D shape (e.g., square, triangle, diamond, polygon, hexagon, etc.), a commonly used object (e.g., a light switch, door handle, picture frame, faucet, etc.), an object previously detected by the system (and with object information stored in a database), or the like.

A marker may be fixed (e.g., non-movable, permanent, etc.) or repositionable (e.g., movable, temporary, etc.). In the example where the marker is fixed, the physical environment around the marker may change, while the marker remains constant. In other words, the position of the marker may be independent of a dynamic surrounding environment. In the example where the marker is repositionable, the marker may be moved to various discrete locations throughout the surrounding physical environment. As discussed in more detail below, a marker may act as an anchor to a simulated reality environment (e.g., by having a position relative to the simulated reality environment). In some embodiments, a fixed marker may be desirable to maintain a constant anchor for a simulated reality environment when the physical space around the fixed marker is frequently changing. In these embodiments, the system may be configured to evaluate the likelihood that an object or image is a fixed marker versus a dynamic component of the physical space. For example, if a user detects the same object consistently over time, then the system may determine that the object is fixed. The system may then use the fixed object as a marker to anchor a simulated reality environment.

FIGS. 8A-8D show exemplary markers that can be used with the system 100. The markers 450*a-d* are each two-dimensional images of a pattern 452*a-d*. In this example, each marker 450*a-d* has a unique pattern 452*a-d*, making each marker 450*a-d* individually identifiable. The markers 450*a-d* depicted also include logos 454 and text 456*a-d*. In some embodiments, the system 100 ignores the logos 454 and text 456*a-d* to reduce error in identifying the specific marker 450*a-d*. In some embodiments, the system 100 may incorporate the text 456*a-d* when analyzing the marker 450*a-d*. For example, in this case, the text 456*a-d* varies across the markers 450*a-d* and may thus be included in the analysis of the markers 450*a-d* to help identify the markers 450*a-d*. In this example, a marker 450*a-d* may be printed and adhered to any surface in a physical space.

A marker may provide various information to a user. For example, a marker may indicate to a user that a simulated reality environment is available. As another example, a marker may provide orientation information to a user (e.g., orienting a user relative to the simulated reality environment). For example, a marker may have a position relative to the simulated reality environment. In this manner, the marker may act as an anchor to the simulated reality environment. The marker may be positioned inside or outside the simulated reality environment. For example, the marker may be positioned proximate, adjacent, or within the simulated reality environment. Orientation information may include information on whether a user is inside or outside the simulated reality environment. In the case where the user is outside the simulated reality environment, the marker may provide information on the user's distance to the marker and intern the user's relationship with the simulated reality environment. In the example where the marker is repositionable, moving the marker respectively moves the simulated reality environment. In this example, while the marker is moved to a new position in the physical environment, the marker remains in the same position relative to the simulated reality environment.

As another example, orientation information may include dimensional information. For example, a marker may provide directional information on which way is up, down, left, right, forward, backward, and the like. The marker may also provide information on the perspective/orientation (e.g., angle and distance) of the user relative to the marker. As one example, a user may perceive foreshortening in a marker, which may indicate that the user is viewing the marker at an angle. In some examples, the degree of foreshortening may indicate the actual angle that the user views the marker. As another example, a user may perceive a marker as larger or smaller, indicating that the user is respectively closer or further away from the marker. In some examples, the size of the marker may be measured to determine the actual distance between the user and the marker.

In some embodiments, a plurality of markers may be used in the system. In these embodiments, one or more of the markers may be unique. Unique markers may be beneficial to distinguish different simulated reality environments or features in two or more physical environments that are similar or identical. For example, it may be desirable to have a different simulated reality environment on each floor of a hotel. Each hotel floor may have the same exact layout with nothing distinguishable between each floor. By applying a unique marker to each hotel floor, the hotel floors can be distinguishable. A unique marker may correspond to a unique simulated reality environment or to a unique simulated scene or location within a single simulated reality environment. In this manner, a hotel floor may have a unique simulated reality environment or location within a single simulated reality environment associated with the physical space (based on the unique marker).

The captured image may be an image of a physical marker that is captured by a camera of the disclosed system. The captured image may be of a two-dimensional or three-dimensional marker. For example, the captured image may be an image of a marker image. The captured image may be a camera image or captured image data.

With continued reference to FIGS. 3A-3C and in accordance with various embodiments, as shown in operation 204, the positioning process 200 includes processing the captured image. For example, various image recognition/processing techniques may be applied to extract data from the captured image. In a more specific example, an image point cluster may be generated from the captured image data based on distinct points within the captured image. An image point cluster is a collection or pattern of distinct points representing a particular image. Distinct points may represent distinctive features of the image and may include, for example, points of intersection, end points, edge points, high and low points (e.g., where there is depth), points of contrast, and the like. In several embodiments, a two-dimensional image point cluster is generated from the captured image data. In other embodiments, a three-dimensional image point cluster can be utilized. In other embodiments, feature matching may be used for image recognition. For example, certain distinguishing features may be extracted from the image. The type of data extracted from the captured image during image processing matches the type of marker data stored in the system 100, as discussed in more detail below.

In accordance with various embodiments, as shown in operation 206, the positioning process 200 includes comparing the captured image data to stored marker data. Stored marker data may be in the form of one or more marker data sets stored in a database 108 of the disclosed system 100. A marker data set includes information related to a physical marker that is detectable by the system. A marker data set may include both identifying marker data and marker location data. Identifying data may include a data representation of a physical marker that enables identification of the physical marker. For example, identifying data may be in the form of a two-dimensional image, an image point cluster, a three-dimensional graphic, or any other data representation of the physical marker. An image point cluster, for example, may correspond to a particular physical marker of the system. As discussed above, the image point cluster includes a pattern of points representing the structure of the physical marker. For example, each point may represent a distinctive feature of the image (e.g., an intersection point, an edge, an end, a point of contrast, and the like). In several embodiments, the image point cluster is a two-dimensional point cluster. In other embodiments, however, a three-dimensional point cluster is also contemplated.

The identifying data may include point of reference data. For example, the point of reference data may indicate the size and angle of the marker data as it is represented in the stored marker data set. The point of reference data may indicate the viewing perspective (e.g., the orientation and distance of a user) that correlates to the particular size and angle of the marker data. For example, the viewing perspective of a marker data set may be a direct view at the location of the marker. For example, the orientation angle may be 90 degrees, indicating that the marker data set reflects a direct (e.g., straight on) view of the corresponding marker. As another example, the size of the image data may be reflective of the size of the corresponding marker at the marker position (e.g., at a distance of zero).

In some embodiments, location data may indicate the position of the corresponding physical marker relative to a simulated reality layout. For example, where the simulated reality layout is defined by a coordinate system (e.g., as shown in FIGS. 5-7), the location data may include coordinates within the coordinate system that correspond to a location of the physical marker relative to the simulated reality layout. In another example, the simulated reality layout may have distinct points or features within the layout. For example, distinct points or features may indicate a wall, floor, ceiling, corner, and the like. In this example, the location data may indicate a position of the corresponding physical marker relative to one or more distinct points or features within the simulated reality layout. For example, as shown in FIG. 7, the location data may indicate that virtual markers 402a-c (and the respective corresponding physical markers) are positioned centrally on an end of the simulated aisles 408a-c and that virtual markers 402d-f (and the respective corresponding physical markers) are positioned centrally on the floor on the right side of each aisle. This data may include dimensions (e.g., marker 402a is positioned 6" above the ground and 3" from either side edge of the aisle 408a).

In some embodiments, the location data may also include information on the marker's position relative to one or more simulated reality assets. Simulated reality assets may include objects representative of real world objects (e.g., trees, food, signs, etc.), logos, text, colors, and the like. The simulated reality assets may be positioned relative to the simulated reality layout. Based on the known location of the simulated reality asset relative to the simulated reality layout and the known location of the marker relative to the simulated reality layout, the position of the marker relative to the simulated reality asset can be determined. This positioning information can be included with the location data. Alternatively, simulated reality assets may be mapped relative to the marker (e.g., without any relation to the simulated reality layout). Information on the location of such simulated reality assets relative to the marker may be included with the location data.

In some embodiments, location data may indicate the position of a marker relative to one or more other markers in the system. In some embodiments, the system may include a plurality of markers. In some embodiments, markers may have different roles within the system. For example, a marker may be a primary marker, secondary marker, tertiary marker, or the like. In one example, a primary marker may have a role that is distinct from all other markers in the system. For example, the primary marker may act as a reference marker to other markers in the system. In this example, the primary marker may have a position relative to a simulated reality environment and other markers in the system may have a position relative to the primary marker. In some embodiments, location data for the primary marker includes the primary marker's position relative to one or more other markers in the system. In an alternate embodiment, the primary marker's location data indicates the primary marker's position relative to the simulated reality layout, while one or more other markers in the system (e.g., secondary, tertiary, and the like) have location data that indicates the other marker's position relative to the primary marker.

A marker data set may also include reference data (e.g., owner of the marker), status or role data (e.g., whether the marker is primary, secondary, tertiary, or the like, as discussed above), copyright information (e.g., related to the associated simulated reality environment), and the like.

In some examples, the stored marker data may be a virtual marker. The virtual marker may be a virtual representation of a physical marker used with the present system. For example, the virtual marker may be a two-dimensional image, a three-dimensional graphic, a marker image point cluster, or any other data representation of the physical marker.

The virtual marker may include location metadata. The location metadata may be similar or the same as the location data discussed above with reference to the marker data set. For example, the location metadata may indicate a position of the virtual marker relative to a simulated reality environment, a corresponding position of the physical marker relative to the simulated reality environment, and/or a position of one or more other markers in the system.

In several embodiments, a plurality of marker data sets or virtual markers are stored. For example, in the embodiment with a plurality of markers, a corresponding plurality of marker data sets or virtual markers are stored in one or more databases. In other words, each marker of the plurality of markers may have a corresponding stored marker data set or virtual marker. In another embodiment, there may be more marker data sets or virtual markers stored in the system than the number of physical markers used in the system. In one example, a plurality of virtual markers may be stored in a database accessible by a user. The user may access the virtual markers and print out one or more virtual markers, creating additional physical markers to use with the system.

In some embodiments, two or more of the plurality of marker data sets or virtual markers are distinct. In other words, at least one marker data set or virtual marker is unique. For example, in embodiments with one or more unique markers, as discussed above, one or more marker data sets corresponds to one or more unique physical markers.

It is contemplated that the stored marker information (e.g., marker data sets or virtual markers) may be permanent or temporary. As one example, a fixed marker may have permanently stored marker information. As another example, a temporary marker may have temporary stored marker information.

In accordance with various embodiments, as shown in operation 208, the positioning process 200 includes determining whether a match is detected. A match indicates a particular degree of similarity between the captured image data and the stored marker data that indicates that the stored marker data corresponds to the marker. A match may be determined based on a tolerance threshold. A tolerance threshold may indicate a degree of similarity that is sufficient for a match determination. For example, a tolerance threshold may be a percent similarity. In several embodiments, a match is determined to be within the tolerance threshold when the captured image data matches the stored marker data (e.g., the identifying data) or virtual marker with a percent similarity of at least 60%, at least 70%, at least 80%, at least 90%, at least 95%, or at least 98%. An example set of stored marker data will be described in more detail in relation to FIG. 10 for which captured image data of a marker may be compared for detecting a match.

Figure 10:
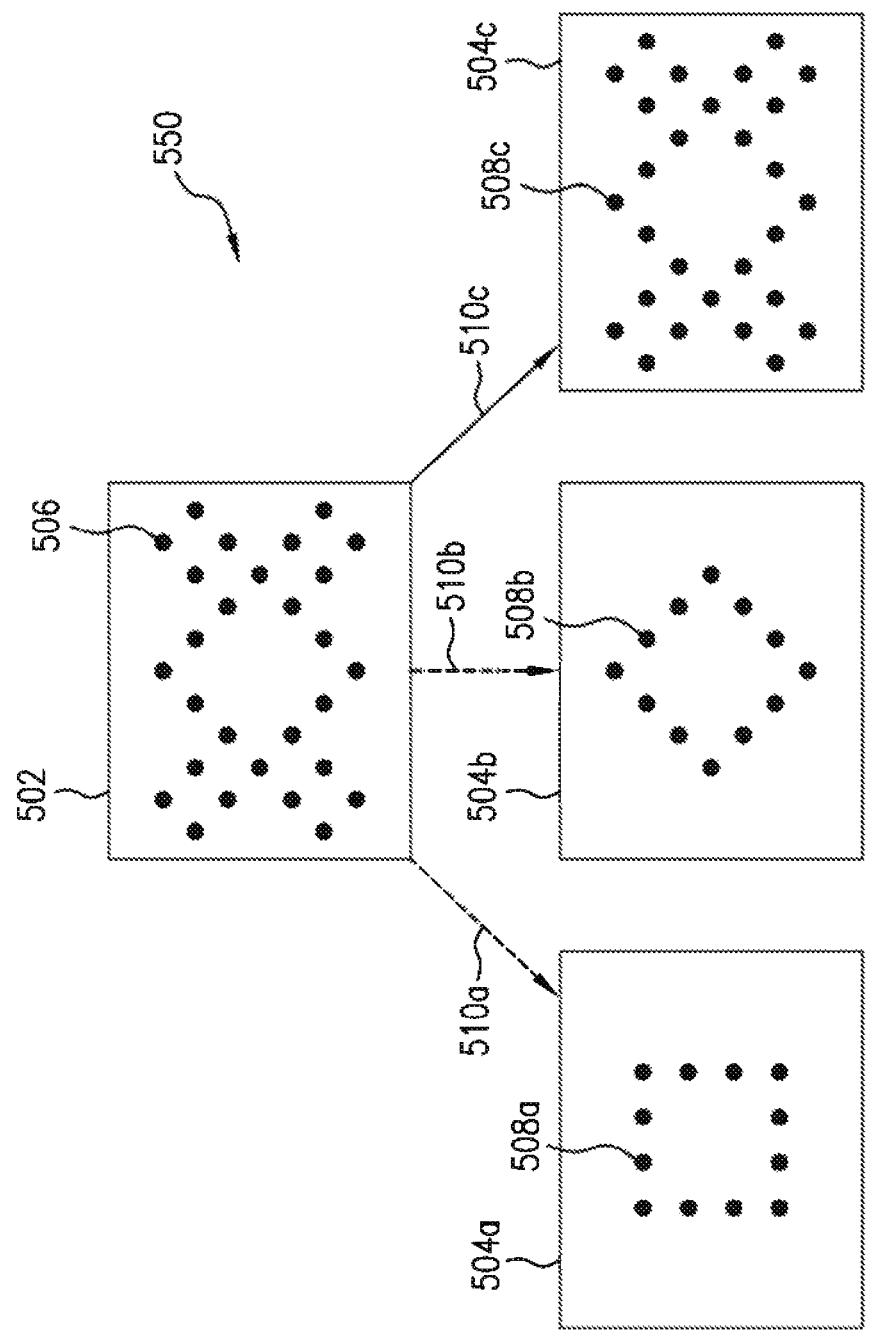
FIG. 10 is a schematic representation of an exemplary comparison of extracted captured image data to stored marker data.

FIG. 10 shows a schematic representation of an exemplary comparison of extracted captured image data to stored marker data to determine whether a stored marker data set matches the captured image data. As shown, the extracted captured image data 502 is in the form of a two-dimensional point cluster 506. A database 108 includes multiple virtual markers 504a-c. Each virtual marker 504a-c is represented as a two-dimensional point cluster 508a-c. As shown, each virtual marker 504a-c is unique, having a unique point cluster 508a-c pattern. The extracted captured image data 502 is compared to each virtual marker 504a-c, as shown by the arrows 510a-c. In the example depicted, the number of points and arrangement of points may be compared. The first virtual marker 504a has less points and a different arrangement of points than the extracted captured image data 502, and the system determines that there is no match, as indicated by the dashed arrow 510a. The system may detect a few points that are in the same position. For example, the system may detect that the images have 7% similarity (e.g., 2/28 points in the captured image point cluster 506 are in the same position in the virtual marker point cluster 508a). If the tolerance threshold is set to at least 60% similarity, the system will determine that the tolerance threshold is not met and that there is no match.

The extracted captured image data 502 may be compared to the second virtual marker 504b. The second virtual marker 504b also has less points and a different arrangement of points than the extracted captured image data 502, and the system determines that there is no match, as indicated by the dashed arrow 510b. The system may detect a few points that are in the same position. For example, the system may detect that the images have 43% similarity (e.g., 12/28 points in the captured image point cluster 506 are in the same position in the virtual marker point cluster 508b). If the tolerance threshold is set to at least 60% similarity, the system will determine that the tolerance threshold is not met and that there is no match.

The extracted captured image data 502 may be compared to the third virtual marker 504c. The third virtual marker 504c has the same number of points and the same arrangement of points as the extracted captured image data 502, and the system determines that there is a match, as indicated by the solid arrow 510c. In this example, the system detects that all points are the same and that the images have 100% similarity (e.g., 28/28 points in the captured image point cluster 506 are in the same position in the virtual marker point cluster 508c). If the tolerance threshold is set to at least 60% similarity, the system will determine that the tolerance threshold is met and that there is a match. While the comparison between the extracted captured image data and the plurality of stored virtual markers is described in a sequence, it is contemplated that such comparison may be done in parallel. It is also contemplated that more points extracted from the image may reduce error in image recognition and image matching.

Returning to FIG. 3A, if no match is detected (operation 208), in accordance with various embodiments, as shown in operation 210, the positioning process 200 notifies a user. The system may notify the user that the marker is not a marker recognized by the system and/or that the system cannot initiate the simulated reality experience. In some embodiments, the user may add the marker to the system. For example, the user may send a request to the system to store the captured image data as a new marker. The user may also provide location information to the system related to the captured image data. For example, the user may measure the distance of the marker to an existing marker and provide this information as location information to the system. As another example, the user may provide the user's position information to the system based on positioning technology in the user device. In this example, the system may be able to determine the position of the marker based on data extracted from the image and the user's position information.

In accordance with various embodiments, if the positioning process 200 does not proceed to operation 210, then the system does not initiate the simulated reality experience and the positioning process 200 ends.

In accordance with various embodiments, if a match is detected (operation 208), as shown in operation 212, the positioning process 200 assesses differences between the captured image data and the stored marker data. A marker looks different from different angles and distances, such that differences in the positioning (e.g., angle) and dimensions of the marker can indicate the perspective and position of the user. The stored marker data may serve as a reference point. For example, the stored marker data may provide a reference angle and distance of a user to the virtual marker. The captured image data may be assessed for differences from the stored marker data, such as, for example, differences in angles (e.g., of lines, vectors between points, shapes, etc.), size (e.g., of lines, points, shapes, etc.), foreshortening (e.g., distances between lines, points, shapes), and the like.

It is contemplated that the differences between the captured image data and the stored marker data may have already been assessed (operation 206) when the captured image data was compared to the stored marker data, thus eliminating the need for additional operations.

In accordance with various embodiments, as shown in operation 214, the positioning process 200 determining the camera's positioning relative to the marker based on the assessment. In several embodiments, the system is able to determine the angle, distance, and direction from the viewpoint of the user to the physical marker based on the appearance of the captured image. For example, as a user moves away from a marker, the size of the marker (and any corresponding marker data) decreases. By determining the difference between the size of the physical marker recorded in the captured image and the size of the virtual marker (or size of identifying data in the stored marker data set), the system can determine the distance of the camera to the physical marker.

As another example, as a user moves at an angle from the marker (e.g., offset from 90 degrees, which indicates a direct view), the marker (and any corresponding marker data) displayed becomes angled. By determining the offset in the angular position of the physical marker in the captured image and the angular position of the virtual marker (or angular position stored as identifying data in the stored marker data set), the system can determine the angular position of the camera relative to the physical marker. In some embodiments, the system is able to determine the direction (e.g., front, back, right, left, etc.) of the camera relative to the marker. For example, foreshortening information related to the marker image may indicate whether the camera is left or right of the marker.

Figure 9:
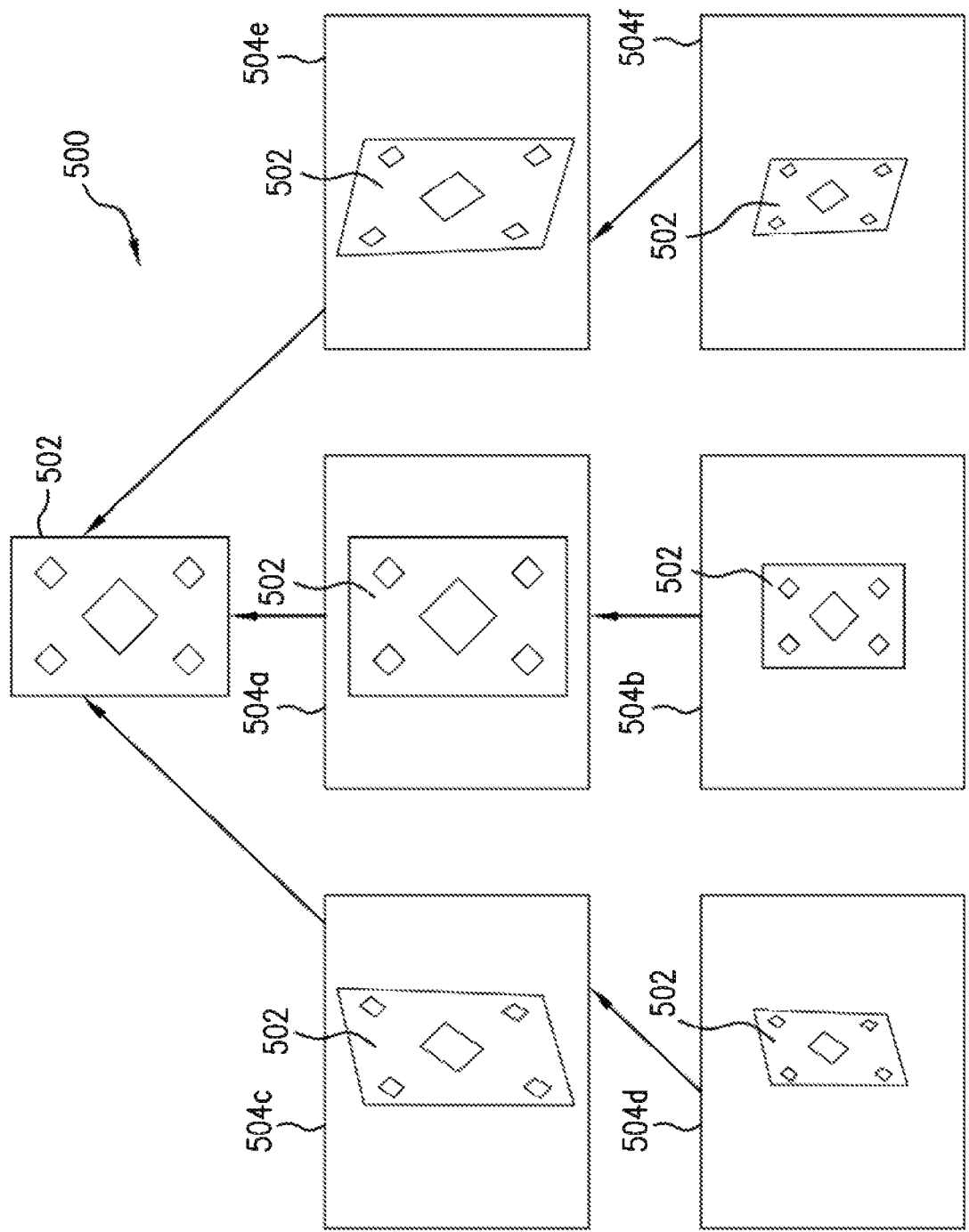
FIG. 9 is a schematic representation of captured images of a physical marker taken from various camera positions and angles.

FIG. 9 shows the differences in captured images as the angle and distance of the camera changes relative to the physical marker. In this example, the physical marker 502 is a two-dimensional image of a pattern. The pattern shows a plurality of diamonds. The captured images 504a-f are of the physical marker 502 and are taken at different angles and distances relative to the physical marker 502. Some of the captured images 504a-b are captured from a direct, straight on view of the physical marker 502. One of the direct captured images 504a is captured at a closer distance than the other direct captured image 504b. Some of the captured images 504c-f are captured at angles from the physical marker 502. Some of the angled captured images 504c, 504e are captured at a closer distance than the other angled captured images 504d, 504f. As shown, varying the angle to the physical marker 502 alters the captured image 504a-f. For example, a direct view of the physical marker 502, as shown by captured images 504a-b, may position the pattern in the same relative location and with the same relative distances between points within the image. As another example, an angled view of the physical marker 502, as shown by captured images 504c-f, may position the pattern at an angle and with varying differences between points (e.g., due to foreshortening). Additionally, varying the distance to the physical marker 502 alters the captured image 504a-f. As shown, the further away the captured image is taken from the marker 502 (e.g., captured images 504d, 504b, 504f), the smaller the marker 502 and marker data (e.g., the pattern) appears in the captured image.

As an example, an exact replica of the physical marker 502 may be stored as a virtual marker. Stored reference data associated with the stored virtual marker may indicate that the virtual marker appearance is from a distance of zero and an angle of 90 degrees (or a direct view of the marker). In this example, the system has already determined that the physical marker 502 corresponds to the stored virtual marker. When captured image 504a is compared to the virtual marker, the system may assess the angle and positioning of the pattern relative to that of the virtual marker. In this case, the system determines that the angles match and the captured image 504a was taken at a 90 degree angle (or direct view) from the physical marker 502. The system also determines that the captured image 504a shows the marker (and pattern) smaller than the virtual marker. For example, the dimensions of the marker in the captured image 504a may be 2 centimeters (cm) less than the dimensions of the virtual marker. The system may determine that a difference of 2 cm indicates the captured image 504a was taken at a distance of 6" from the physical marker 502. This information in turn can be used to determine the position of the user or the user's device 102 relative to the markers. As discussed above, the transverse distance, lateral distance, and height of the device relative to the marker can be determined via the comparison of known images of the makers.

When captured image 504b is compared to the virtual marker, the system may assess the angle and positioning of the pattern relative to that of the virtual marker. In this case, the system determines that the angles match and the captured image 504b was taken at a 90 degree angle (or direct view) from the physical marker 502. The system also determines that the captured image 504b shows the marker (and pattern) smaller than the virtual marker. For example, the dimensions of the marker in the captured image 504b may be 4 cm less than the dimensions of the virtual marker. The system may determine that a difference of 4 cm indicates the captured image 504b was taken at a distance of 1' from the physical marker 502. This information in turn can be used to determine the position of the user or the user's device 102 relative to the markers. As discussed above, the transverse distance, lateral distance, and height of the device relative to the marker can be determined via the comparison of known images of the makers.

When captured image 504c is compared to the virtual marker, the system may assess the angle and positioning of the pattern relative to that of the virtual marker. In this case, the system determines that the angle of the captured image 504c is offset from the angle of the virtual marker (e.g., the diamonds are narrower and at an angle). The system may use lines in the image, vectors, or the like, to assess the offset in the angle. For example, the system may determine that the captured image 504c is offset from the virtual marker by an angle of 45 degrees. The system then determines that the camera was positioned at a 45 degree angle relative to the physical marker 502. The system may also determine the direction of the angle. For example, the system may determine that the left side of the marker 502 is larger than the right side of the marker 502, indicating that the marker 502 was viewed from the left side. The system also determines that the captured image 504c shows the marker (and pattern) smaller than the virtual marker. For example, the dimensions of the marker in the captured image 504c may be 3 cm less than the dimensions of the virtual marker. The system may determine that a difference of 3 cm indicates the captured image 504c was taken at a distance of 8" from the physical marker 502. This information in turn can be used to determine the position of the user or the user's device 102 relative to the markers. As discussed above, the transverse distance, lateral distance, and height of the device relative to the marker can be determined via the comparison of known images of the makers.

The system may assess captured image 504d in the same manner as discussed above with captured image 504c. In this case, the system may determine that the captured image 504d is offset from the virtual marker by an angle of 45 degrees. The system then determines that the camera was positioned at a 45 degree angle relative to the physical marker 502. The system may determine that the left side of the marker 502 is larger than the right side of the marker 502, indicating that the marker 502 was viewed from the left side. The system also determines that the captured image 504d shows the marker (and pattern) smaller than the virtual marker. For example, the dimensions of the marker in the captured image 504d may be 6 cm less than the dimensions of the virtual marker. The system may determine that a difference of 6 cm indicates the captured image 504c was taken at a distance of 1'4" from the physical marker 502. This information in turn can be used to determine the position of the user or the user's device 102 relative to the markers. As discussed above, the transverse distance, lateral distance, and height of the device relative to the marker can be determined via the comparison of known images of the makers.

The system may assess captured image 504e in the same manner as discussed above with captured image 504c. In this case, the system may determine that the captured image 504e is offset from the virtual marker by an angle of 45 degrees. The system then determines that the camera was positioned at a 45 degree angle relative to the physical marker 502. The system may determine that the right side of the marker 502 is larger than the left side of the marker 502, indicating that the marker 502 was viewed from the right side. The system also determines that the captured image 504e shows the marker (and pattern) smaller than the virtual marker. For example, the dimensions of the marker in the captured image 504e may be 3 cm less than the dimensions of the virtual marker. The system may determine that a difference of 3 cm indicates the captured image 504e was taken at a distance of 8" from the physical marker 502. This information in turn can be used to determine the position of the user or the user's device 102 relative to the markers. As discussed above, the transverse distance, lateral distance, and height of the device relative to the marker can be determined via the comparison of known images of the makers.

The system may assess captured image 504f in the same manner as discussed above with captured image 504c. In this case, the system may determine that the captured image 504f is offset from the virtual marker by an angle of 45 degrees. The system then determines that the camera was positioned at a 45 degree angle relative to the physical marker 502. The system may determine that the right side of the marker 502 is larger than the left side of the marker 502, indicating that the marker 502 was viewed from the right side. The system also determines that the captured image 504f shows the marker (and pattern) smaller than the virtual marker. For example, the dimensions of the marker in the captured image 504f may be 6 cm less than the dimensions of the virtual marker. The system may determine that a difference of 6 cm indicates the captured image 504f was taken at a distance of 1'4" from the physical marker 502. This information in turn can be used to determine the position of the user or the user's device 102 relative to the markers. As discussed above, the transverse distance, lateral distance, and height of the device relative to the marker can be determined via the comparison of known images of the makers.

In the example where point clusters are compared and analyzed, the perspective of the user (e.g., angle and distance to marker) may be determined based on the shape of the point cluster. For example, the points may appear to be closer together when the point cluster is viewed at an angle. As another example, the points may appear smaller when the point cluster is viewed from a greater distance.

In an alternate embodiment, a plurality of stored marker data sets or virtual markers may correspond to various perspectives of the same physical marker. Once corresponding stored marker data sets or virtual markers are determined, the captured image can be compared to the plurality of stored marker data sets or virtual markers to determine a match. In one example, when the captured image matches a stored marker data set or virtual marker within a threshold value (e.g., by 70%, 80%, 90%, etc.), the perspective of the captured image can be determined based on the matching stored marker data set or virtual marker. In another example, the stored marker data set or virtual marker that matches the captured image to the highest degree of the plurality of stored marker data sets or virtual markers, may be determined to be a matching stored marker data set or virtual marker. The perspective of the captured image can be determined from the matching stored marker data set or virtual marker.

In accordance with various embodiments, as shown in operation 216, the positioning process 200 determines the camera's positioning relative to the simulated reality layout. Once the position of the camera (and thus the user) relative to the marker is determined, the position of the camera (and the user) relative to the simulated reality environment may also be determined based on the known location of the marker relative to the simulated reality environment. As discussed above, the stored marker data may include location information that positions the marker relative to a simulated reality layout. Based on the relative positioning of the marker to both the simulated reality layout and the user, the system can apply a mathematical algorithm to determine the position of the user relative to the simulated reality layout.

Once a camera's position relative to a simulated reality environment is known, the system can retrieve a simulated reality asset for meaningful display within the simulated reality environment relative to the user. For example, using the precise positioning of the camera, the system can determine the appropriate perspective view of the simulated reality asset or object. A perspective view refers to a height, depth and width of an object registered in a three-dimensional image view or scene in a simulated reality environment. The system determines, for example, the angle, size, and foreshortening aspects of the simulated reality asset or object to display to the user. In this manner, the simulated reality asset or object is displayed according to the precise positioning of the camera relative to the simulated reality environment.

The user may view the simulated reality environment through a display on the user device. For example, the user may be positioned in a virtual reality environment inside a log cabin, facing towards the front door. The user may view the front door through a display on the user device. The user may walk towards the front door, which, in this example, correlates to a physical door. When the user opens the physical door and steps through the physical doorway, the user may enter a forest in the virtual reality environment, which is shown on the display of the user device. If the user turns around, the user can view the front door of the log cabin through the display on the user device. Because the user has been previously positioned relative to the virtual reality environment, the user's positioning in the physical environment corresponds to positioning in the virtual reality environment. Virtual assets (in this example, the log cabin, door, trees, etc.) are mapped within the virtual reality environment, such that the user's positioning relative to the virtual assets can be determined based on the user's positioning relative to the virtual reality environment. In this example, the user's positioning relative to the log cabin door is determinable based on the original positioning relative to the marker.

Once a user's position is calibrated relative to the simulated reality environment, a user may move around the physical environment and reposition his or her self relative to the simulated reality environment.

As illustrated in FIG. 3B operation 222, in various embodiments, of the process 220, the user moves away from the first marker. Without the positional information gleaned from the first marker, the system provides a secondary position system 115 for establishing location between markers. As illustrated in operation 224 of the process 220, in the absence of the first marker the user's position is updated via the secondary position system to establishing the new location of the user away from the first marker. For example, the secondary positioning system 115 may include internal navigation sensors (e.g., optic sensors, wireless internet receivers, inertial measurement units, gyroscopic measurement units, etc.) The roaming user can be repositioned relative to the simulated reality environment using sensor-fusion. As the user moves around the physical space (and away from the marker), the internal navigation technology using a fusion of the one or more sensors repositions the user relative to a first (previously scanned) marker and thus relative to the simulated reality environment. In conjunction with one or more of the navigation sensors, a roaming user may be repositioned relative to the simulated reality environment using simultaneous localization and mapping (SLAM). The SLAM algorithm constructs or updates a map of an unknown environment while simultaneously keeping track of the user location within it. In accordance with various embodiments, the SLAM algorithm is tailored to the available sensors to achieve an operation compliance in locating a user. Sensors include information streaming from the camera feed, device accelerometers, and LIDAR time of flight.

In other embodiments, the system may use a more general positioning system such as a Global Positioning System (GPS). The user device positioning capabilities may be limited. For example, GPS drift (e.g., due to obstruction of satellite data on a user's position) may limit the user device's positioning capabilities. Thus, as a user moves further away from the first marker, the degree of error in positioning the user relative to the simulated reality environment may increase. In this case, a user may need to recalibrate his or her position within the simulated reality environment. On such an occasion, the user can determine the secondary position away from the marker utilizing the secondary positioning system 115, as shown in operation 226 of the process 220.

In various embodiments, the process 220 can capture another image either before or after updating the user position via the secondary positioning system 115. In operation 228 of process 220, a determination is made whether another captured image is received. If an image is not captured, the process 220 can repeat updating the user location via the secondary position system 115, by returning to operation 222. As illustrated in FIG. 3C, if an image is captured, the locating system can process the captured image as shown in operation 254 of process 250. The process 250 can compare the captured image data to stored marker data as shown in operation 256. If a match is detected, as shown in operation 258, the process 250 can use the information gleaned from the marker to update the camera position based on the comparison, as shown in operation 262. The camera position can then be recalibrated relative to the simulated reality layout based on the newly determined location of the second marker and the relational position of the camera, as shown in operation 264 of process 250.

In various embodiments, the process 250 receives the captured image of a second marker. The second marker may be positioned at a distance from the first marker. The second marker and the first marker may both be within a viewer's eyesight or the two markers may be positioned such that a viewer cannot view both markers at the same time. For example, the first marker may be in one room or aisle and the second marker may be in another room or aisle.

The second marker may be the same type of marker as the first marker. For example, if the first marker is a two-dimensional image, the second marker is a two-dimensional image, and if the first marker is a three-dimensional object, the second marker is a three-dimensional object. Alternatively, the second marker may be a different type of marker than the first marker. For example, if the first marker is a two-dimensional image, the second marker may be a three-dimensional object, and vice versa.

The first marker and the second marker may have different roles in the system. For example, the first marker may be a primary marker and the second marker may be a secondary marker. As discussed in more detail above, a primary marker may be the anchor or reference point to the simulated reality environment. The captured image may be similar to the captured image discussed above with reference to FIG. 3A.

As shown in operation 254, the captured image is processed into captured image data. Various image recognition/processing techniques may be applied to extract data from the captured image. For example, the same image processing performed on the captured image of the first marker in positioning process 200 may be executed on the captured image of the second marker. The type of data extracted from the captured image during image processing matches the type of marker data stored in the system 100.

As shown in operation 256, the captured image data is compared to stored marker data. As discussed in more detail above, the stored marker data may include both identifying data and location data. The location data may include information on the marker's position relative to a simulated reality environment. Alternatively or additionally, the location data may include information on the marker's position relative to one or more other markers in the system (e.g., to a primary marker).

As shown in operation 258, the process 250 determines whether a match is detected. The comparison and match detection steps are similar to the steps discussed above with reference to FIG. 3A. For example, FIG. 9 shows exemplary captured images 504*a-f* that can be compared to a virtual marker that is identical to the physical marker 502 shown in the figure. As another example, FIG. 10 shows an exemplary matching technique used by the system to determine whether captured image data matches stored marker data.

If there is no matching stored marker data, a notification is sent to the user as shown in operation 260. For example, the process 250 may notify the user that the marker is not a marker recognized by the system and/or that the system cannot recalibrate the simulated reality experience. In some embodiments, the user may add the second marker to the system. For example, the user may send a request to the system to store the captured image data as a new marker. The user may also provide location information to the system related to the captured image data. For example, the user may measure the distance of the second marker to the first marker and provide this information as location information to the system. As another example, the user may provide the user's position information to the system based on positioning technology in the user device. In this example, the system may be able to determine the position of the marker based on data extracted from the image and the user's position information.

If the system does not recalibrate the simulated reality experience and the process 250 may end or may repeat back to process 220.

If matching stored marker data is detected, the camera's position is updated relative to the second marker based on the comparison as shown in operation 262. As discussed above with reference to FIG. 3A, differences between the captured image data and the stored marker data may be assessed to determine the angle, direction, and distance from the viewpoint of the user to the physical marker.

As shown in operation 264, the camera's position relative to the simulated reality layout is recalibrated based on a known location of the second marker. Once the position of the camera (and thus the user) relative to the second marker is determined, the position of the camera (and the user) relative to the simulated reality environment may also be determined based on the known location of the second marker relative to the simulated reality environment. The location of the second marker relative to the simulated reality environment may be determined directly or indirectly. For example, as discussed above, the stored marker data may include location information that positions the second marker relative to the simulated reality layout. In this example, the location is directly determined. In another example, as discussed above, the second marker data may include location information that positions the second marker relative to the first marker. As discussed with reference to FIGS. 3A-3C, the first marker may be associated with location information that positions the first marker relative to the simulated reality layout. Based on the relative position of the first marker to both the second marker and the simulated reality layout, the system can apply a mathematical algorithm to determine the position of the second marker relative to the simulated reality layout. In this example, the location is indirectly determined. Based on the relative positioning of the second marker to both the simulated reality layout and the user, the system can apply a mathematical algorithm to recalibrate the position of the user relative to the simulated reality layout. The mathematical computation used are solving the trigonometric ratio where the distance and angel between two points on the markers can imply the location of the user.

While the embodiment discussed above uses a second marker for recalibration, it is also contemplated that the first marker may be used to recalibrate the user's position relative to the simulated reality environment in addition to or as an alternative to using the second marker. For example, a user may move away from the first marker to view the simulated reality environment. As the user moves around, the accuracy in the positioning of the simulated reality environment may decrease. The user may return to the first marker and scan the first marker to recalibrate the user's position relative to the simulated reality environment. The user may recalibrate the system with the first marker when there are one or more markers in the system. It is contemplated that multiple markers may be used to recalibrate the position of the user relative to the simulated reality environment.

In several embodiments, additional markers may be added to the physical environment to increase the number of calibration points and reduce the error in positioning a user relative to the simulated reality environment. For example, an additional marker may be positioned within the physical environment at a distance from the one or more markers that are already established within the system. A user may scan the marker with his or her user device and upload the captured image to the system, indicating that the captured image is intended as a new marker. The system may receive the image and store it as a new marker in the database. Using more markers in the system can lead to higher precision in positioning the user within the simulated reality environment.

In an alternate embodiment, the system may add markers to the system through machine learning. For example, the system may be able to add new markers on the fly in real time as the system recognizes objects as markers. In some embodiments, a user may scan an image or object that the system does not recognize as a marker. The system may determine that the image or object is not a marker and assess whether the image or object would make a reliable marker (e.g., whether it is identifiable, fixed/constant, etc.). If the system determines that the image or object would make a reliable marker, the system may add the image or object data as a virtual marker or marker data set in the database.

It is also contemplated that one or more markers may be removed from the system. For example, if an area of the physical space no longer has an associated simulated reality environment, then the area may no longer need any markers to position a user in the simulated reality environment. A user may physically remove the markers or the corresponding marker data may be deleted such that the one or more markers are no longer recognized by the system.

The system may account for error in positioning the simulated reality environment relative to a user. For example, the system may account for variations in camera technology. For example, the system may receive camera information and assess the likelihood that images captured by the camera are distorted. For example, a camera with a zoom lens may appear closer to the marker than in reality. In this example, the system may be able to factor in the level of zoom when determining the distance of the camera to the marker. As another example, the system may account for Wi-Fi and beacon signal strength when a marker is recognized.

The technology described herein may be implemented as logical operations and/or modules in one or more systems. The logical operations may be implemented as a sequence of processor implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of executable operations on a computer system or computing device to implement the procedural operations described herein, such as those described above in relation to FIGS. 3A-3C. One implementation of a computer program product provides a non-transitory and tangible computer program storage medium readable by a computer system or computing device and encoding a computer program. It should further be understood that the described technology may be employed in special purpose devices independent of a personal computer.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system for presenting simulated reality relative to a user's position, comprising:
   a camera;
   a non-transitory memory containing computer readable programming instructions; and
   a processor configured to execute the programming instructions to cause the processor to:
   receive a first captured image of a first marker from the camera, wherein the first marker has a first position relative to a simulated reality layer, the simulated reality layer including information relating to positioning of a simulated reality object in a simulated reality environment,
   compare the first captured image to one or more stored marker data sets stored in a database to determine whether the first captured image corresponds to a stored marker data set of the one or more stored marker data sets,
   when the first captured image corresponds to the stored marker data set of the one or more stored marker data sets, determine a position of the camera relative to the first marker based on the corresponding stored marker data set,
   determine, based on the position, a first position of the camera relative to the simulated reality layer,
   cause a display, on a display device, of the simulated reality environment having the simulated reality object, based on the first position of the camera relative to the simulated reality layer,
   subsequent to the display, receive a second captured image of a second marker from the camera, wherein the second marker has a second position relative to the simulated reality layer,
   compare the second captured image to one or more stored marker data sets stored in a database to determine whether the second captured image corresponds to a stored marker data set of the one or more stored marker data sets,
   when the second captured image corresponds to the stored marker data set of the one or more stored marker data sets, determine an updated position of the camera relative to the second marker based on the corresponding stored marker data set,
   determine, based on the updated position, a second position of the camera relative to the simulated reality layer, and
   cause an updated display, on the display device, of the simulated reality environment having the simulated reality object, based on the second position of the camera relative to the simulated reality layer.

2. The system of claim 1, wherein each stored marker data set of the one or more stored marker data sets comprises identifying data and location data.

3. The system of claim 2, wherein the first captured image or the second captured image corresponds to a stored marker data set in response to image data extracted from the first captured image or the second captured image matching the identifying data of the corresponding stored marker data set within a tolerance threshold.

4. The system of claim 3, wherein:
   the extracted image data from the first captured image or the second captured image is an image point cluster;
   the identifying data is a marker point cluster; and
   in response to executing the programming instructions, the processor is further caused to:
   determine one or more differences between the image point cluster and the marker point cluster, and
   determine the position of the camera relative to the first marker or the second marker based on the one or more differences wherein the position of the camera corresponds to a perspective correlated to a user's perspective relative to the first marker or the second marker in the simulated reality environment and a perspective view of the simulated reality object displayed on a display device is relative to the user's perspective in the simulated reality environment.

5. The system of claim 2, wherein the location data of the corresponding stored marker data set is used to determine a marker position relative to the simulated reality layer.

6. The system of claim 1, wherein in response to executing the programming instructions, the processor is further caused to:
determine that the captured image does not correspond to any of the one or more stored marker data sets; and
store, in the data store, a new marker data set, the new marker data set comprising the captured image, identifying data associated with the marker, and location data associated with the marker.

7. The system of claim 1, wherein in response to executing the programming instructions, the processor is further caused to determine an orientation, angle, and distance of the simulated reality object relative to the camera based upon the determined position or the determined updated position of the camera relative to the simulated reality layer.

8. The system of claim 1, wherein the simulated reality is one of augmented reality and virtual reality.

9. The system of claim 1, wherein the one or more stored marker data sets comprises a plurality of stored marker data sets, and wherein at least one stored marker data set corresponds to a unique marker.

10. The system of claim 1, wherein in response to executing the programming instructions, the processor is further caused to:
upon determination of the first position, detect movement of the camera such that the marker moves out of a viewable range of the camera; and
determine, based on a secondary positioning system and the first position, an intermediate position of the camera relative to the simulated reality layer before the second marker moves within the viewable range of the camera, the secondary positioning system being a non-marker based positioning system.

11. A method for orienting a user relative to a simulated reality layer, the method comprising:
by one or more processors:
receiving first captured image data of a first marker from a camera, wherein the first marker has a location relative to a simulated reality layer of a simulated reality environment;
comparing the first captured image data to a plurality of stored marker data sets to determine whether the first captured image data matches a stored marker data set of the plurality of stored marker data sets;
when the first captured image matches the stored marker data set of the plurality of stored marker data sets, determining a position of the camera relative to the first marker;
determine, based on the position, a first position of the camera relative to the simulated reality layer;
causing a display on a display device of the simulated reality environment having a simulated reality object, based on the first position of the camera relative to the simulated reality layer;
subsequent to the display, receive a second captured image of a second marker from the camera, wherein the second marker has a second position relative to the simulated reality layer,
compare the second captured image to one or more stored marker data sets stored in a database to determine whether the second captured image corresponds to a stored marker data set of the one or more stored marker data sets,
when the second captured image corresponds to the stored marker data set of the one or more stored marker data sets, determine an updated position of the camera relative to the second marker based on the corresponding stored marker data set,
determine, based on the updated position, a second position of the camera relative to the simulated reality layer, and
cause an updated display, on the display device, of the simulated reality environment having the simulated reality object, based on the second position of the camera relative to the simulated reality layer.

12. The method of claim 11, further comprising, by the one or more processors:
determining variations between the first captured image data or the second captured image data and the stored marker data set; and
determining, based on the variations, the position of the camera relative to the first marker or the updated position of the camera relative to the second marker.

13. The method of claim 12, wherein the determining of the position or the update position of the camera further includes determining an orientation, angle and distance of the camera relative to the first marker or the second marker.

14. The method of claim 11, further comprising, by the one or more processors:
determining that the first captured image or the second captured image does not correspond to any of the plurality of stored marker data sets; and
store, in the data store, a new marker data set, the new marker data set comprising the first captured image or the second captured image, identifying data associated with the first marker or the second marker, and location data associated with the first marker or the second marker.

15. The method of claim 11, wherein the second marker has a known location relative to the first marker; and
the method further comprises recalibrating the position of the user relative to the simulated reality layer based on the determined updated position of the camera relative to the second marker and the known location of the second marker relative to the first marker.

16. The method of claim 11, wherein the first position or the second position of the camera relative to the simulated reality layer determines a perspective view in which the simulated reality object is displayed to the user.

17. The method of claim 11, wherein the first marker or the second marker is a two-dimensional image.

18. The method of claim 11, wherein the first marker or the second marker is one of fixed and repositionable.

19. The method of claim 11, further comprising, by the one or more processors:
upon determination of the first position, detecting movement of the camera such that the first marker moves out of a viewable range of the camera; and
determining, based on a secondary positioning system and the first position, an intermediate position of the camera relative to the simulated reality layer before the second marker moves within the viewable range of the camera, the secondary positioning system being a non-marker based positioning system.

20. A computer-implemented simulated reality positioning system comprising:

a storage device configured to store a plurality of virtual markers; and one or more processors configured to:
  identify a first two-dimensional image,
  extract data from the first two-dimensional image,
  compare the extracted data to the plurality of stored virtual markers,
  determine a matching stored virtual marker, wherein the matching stored virtual marker has a location relative to a simulated reality environment,
  associate the first two-dimensional image with the location relative to the simulated reality environment,
  determine a position of a user relative to the first two-dimensional image based on the comparison of the extracted data to the one or more stored virtual markers,
  determine an updated position of the user relative to the simulated reality environment based on a secondary positioning system when the user is out of viewable range of the first two-dimensional image, the secondary positioning system being a non-marker based positioning system,
  display, on a display device, a simulated object in the simulated reality environment at a perspective view relative to the determined position of the user or the updated position of the user,
  subsequent to the display, when the user is within a viewable range of a second two-dimensional image, recalibrating the position of the user relative to the simulated reality layer based on a comparison of data extracted from the second two-dimensional image that appears to the one or more stored virtual markers.

21. The computer-implemented simulated reality positioning system of claim 20, wherein the one or more processors are further configured to determine a position of the user relative to the simulated reality environment based on the determined position of the user relative to the first two-dimensional image.

22. The computer-implemented simulated reality positioning system of claim 20, wherein the one or more processors are further configured to:
  determine that the matching stored virtual marker does not exist; and
  store, in the storage device, a new virtual marker, the new virtual marker comprising the extracted data and location data associated with the two-dimensional image.

* * * * *